(12) United States Patent
Nield

(10) Patent No.: US 11,868,125 B2
(45) Date of Patent: Jan. 9, 2024

(54) CONTROLLING SIMULATED AND REMOTELY CONTROLLED FLYABLE AIRCRAFT WITH HANDHELD DEVICES

(71) Applicant: Yawman LLC, Carmel, IN (US)

(72) Inventor: Thomas Michael Nield, Frisco, TX (US)

(73) Assignee: Yawman LLC, Carmel, IN (US)

( * ) Notice: Subject to any disclaimer, the term of this patent is extended or adjusted under 35 U.S.C. 154(b) by 245 days.

(21) Appl. No.: 17/383,728

(22) Filed: Jul. 23, 2021

(65) Prior Publication Data

US 2023/0025582 A1 Jan. 26, 2023

(51) Int. Cl.
*G05D 1/00* (2006.01)
*G05D 1/10* (2006.01)
*B64C 39/02* (2023.01)
*G05D 1/08* (2006.01)

(52) U.S. Cl.
CPC ......... *G05D 1/0016* (2013.01); *B64C 39/024* (2013.01); *G05D 1/0808* (2013.01); *G05D 1/101* (2013.01); *B64U 2201/20* (2023.01)

(58) Field of Classification Search
CPC .... G05D 1/0016; G05D 1/0808; G05D 1/101; B64C 39/024; B64C 13/04; B64C 13/24; B64C 13/503; B64C 13/505; B64U 2201/20; B64U 2101/30
See application file for complete search history.

(56) References Cited

U.S. PATENT DOCUMENTS

| 6,128,006 A | 10/2000 | Rosenberg et al. |
| D453,932 S | 2/2002 | Han et al. |
| D504,430 S | 4/2005 | Takahashi et al. |
| (Continued) | | |

FOREIGN PATENT DOCUMENTS

KR 101392265 5/2014

OTHER PUBLICATIONS

"Looking for advice on improvements for HOTAS/gamepad.", Reddit; downloaded May 5, 2021, from https://www.reddit.com/r/HotasDIY/comments/n1ql33/looking_for_advice_on_improvements_for/, 11 pgs.

(Continued)

*Primary Examiner* — Orlando Bousono
(74) *Attorney, Agent, or Firm* — Henry Patent Law Firm PLLC

(57) ABSTRACT

In a general aspect, a handheld controller device includes a housing and a trigger assembly. The housing is configured to be held in the hands of a user. The trigger assembly includes a pair of triggers extending outward from a side of the handheld controller device and configured to move along respective trigger paths. A coupling assembly is disposed inside the housing and connected to the pair of triggers. The coupling assembly is configured to transfer motion between the pair of triggers such that, when either of the triggers moves towards the housing along its respective trigger path, the coupling assembly moves the other trigger an equal distance away from the housing along its trigger path. Circuitry in the housing includes one or more sensors and a microcontroller configured to receive sensor signals and, in response, generate aircraft control data (e.g., for a flight simulation or remotely controlled flyable aircraft).

23 Claims, 13 Drawing Sheets

(56) References Cited

U.S. PATENT DOCUMENTS

| | | | |
|---|---|---|---|
| D546,904 S | 7/2007 | Bowen et al. | |
| D573,204 S | 7/2008 | Arai et al. | |
| D670,768 S | 11/2012 | Isono et al. | |
| D672,397 S | 12/2012 | Wai | |
| D685,434 S | 7/2013 | Ali et al. | |
| 867,640 A1 | 3/2014 | Coffman et al. | |
| 8,676,406 B2 | 3/2014 | Coffman et al. | |
| D707,758 S | 6/2014 | Norman et al. | |
| D712,982 S | 9/2014 | Barajas et al. | |
| 8,932,135 B2 | 1/2015 | Coe | |
| D735,721 S | 8/2015 | Mar | |
| D740,708 S | 10/2015 | Pecorari | |
| D749,527 S | 2/2016 | Li | |
| 9,522,726 B1 | 12/2016 | Bowers | |
| 9,533,219 B2 | 1/2017 | Burgess et al. | |
| D780,269 S | 2/2017 | Isono et al. | |
| D806,078 S | 12/2017 | Goldman et al. | |
| 10,232,254 B2 | 3/2019 | Gassoway et al. | |
| D856,334 S | 8/2019 | Salter | |
| 10,427,035 B2 | 10/2019 | Schmitz et al. | |
| D870,825 S | 12/2019 | Wang et al. | |
| D872,185 S | 1/2020 | Chatterjee et al. | |
| D885,497 S | 5/2020 | Miller | |
| D892,115 S | 8/2020 | Gan | |
| 10,994,197 B2 | 5/2021 | Schmitz | |
| D992,645 S | 7/2023 | Nield | |
| 2014/0111317 A1 | 4/2014 | Shen | |
| 2015/0202540 A1* | 7/2015 | Erhart | G05D 1/0808 340/12.5 |
| 2015/0370256 A1* | 12/2015 | Erhart | G05D 1/0808 701/2 |
| 2017/0036771 A1* | 2/2017 | Woodman | B64D 27/26 |
| 2017/0309088 A1* | 10/2017 | Arya | G07C 5/008 |
| 2017/0349277 A1* | 12/2017 | Erhart | G05D 1/0016 |
| 2018/0081351 A1* | 3/2018 | Tankersley | G05D 1/0038 |
| 2018/0095492 A1 | 4/2018 | Matloff | |
| 2018/0104574 A1 | 4/2018 | Tager | |
| 2020/0250903 A1* | 8/2020 | Arya | H04L 69/14 |
| 2020/0272144 A1* | 8/2020 | Yang | B64C 39/024 |
| 2020/0391878 A1* | 12/2020 | Woodman | B64C 25/10 |
| 2021/0173391 A1* | 6/2021 | Parazynski | G05D 1/0016 |

OTHER PUBLICATIONS

Fselite, Yawman Arrow; retrieved from Internet Feb. 14, 2023; https://fselite.net/content/first-look-yawman-arrow/, Jan. 17, 2023, 1 pg.

Yawman Flight, Yawman Arrow; retrieved from Internet Feb. 14, 2023; https://yawmanflight.com/blogs/news/introducting-the-yawman-arrow, Jan. 17, 2023, 1 pg.

BETAFPV, Literadio 2SE Transmitter, retrieved from Internet on Feb. 14, 2023; https://www.amazon.com/BETAFPV-Literadio-Transmitter-Throttle-Controller/dp/B08PV3QRTG/ref=cm_cr_arp_d_product_top?ie=UTF8, Mar. 9, 2021, 1 pg.

"FrSky", Taranis X-Lite Pro, retrieved from Internet on Feb. 14, 2023; https://www.amazon.com/FrSky-Installed-Protocol-Wireless-Tranining/dp/B07QJ38Q1X/ref=cm_cr_arp_d_product_top?ie=UTF8, Dec. 4, 2019, 1 pg.

* cited by examiner

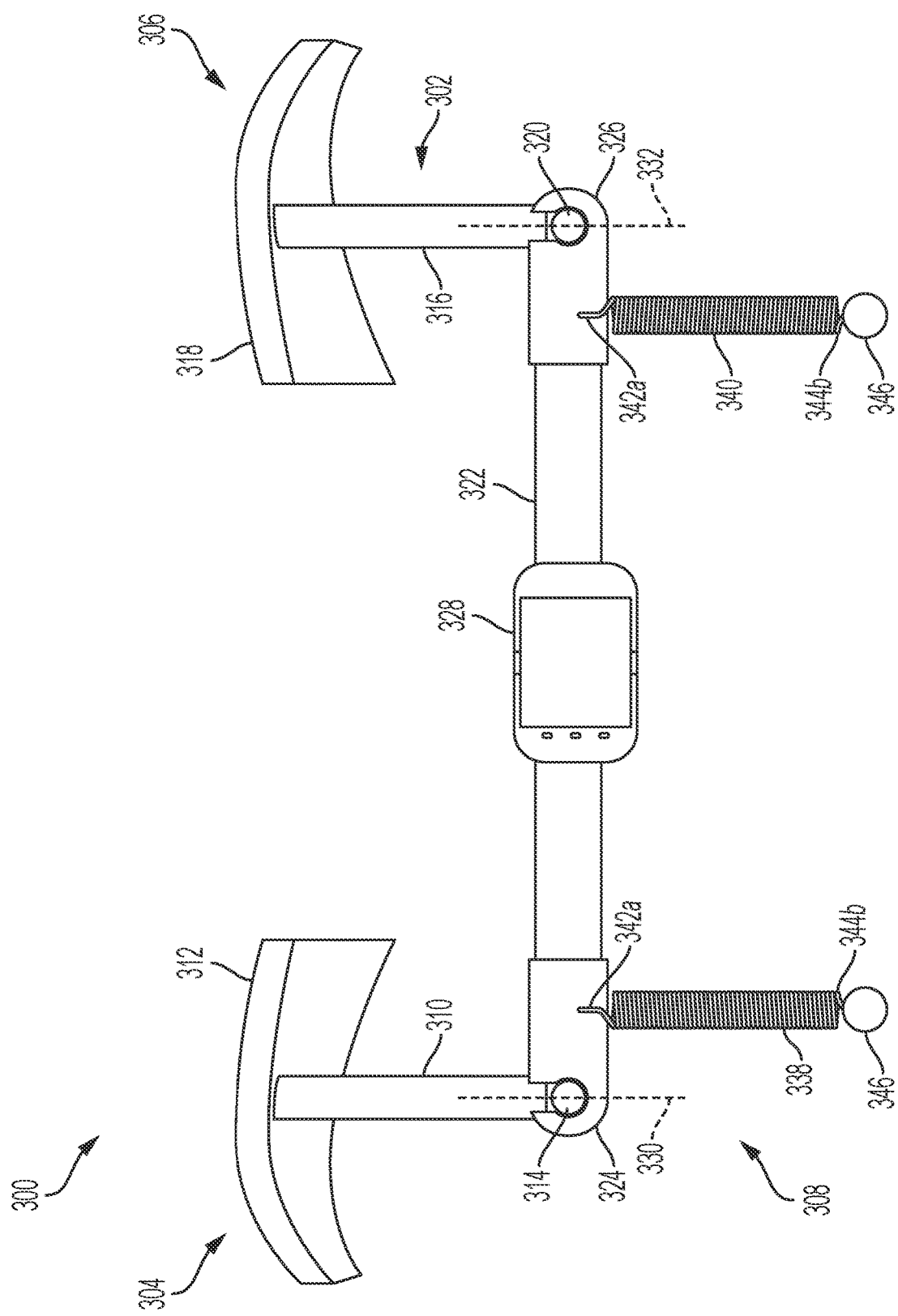

CONTROLLING SIMULATED AND REMOTELY CONTROLLED FLYABLE AIRCRAFT WITH HANDHELD DEVICES

BACKGROUND

The following description relates to controlling simulated and remotely controlled flyable aircraft with handheld devices.

Aircraft, such as fixed- and rotary-wing aircraft, include flight control surfaces that control the direction and speed of the aircraft during flight. The flight control surfaces, in particular, may alter a pitch, a yaw, or a roll of the aircraft to influence its direction. For example, a fixed-wing aircraft may include a movable elevator on its horizontal stabilizer to alter a pitch during flight. Similarly, a rotary-wing aircraft may include tail rotor blades to alter a yaw during flight. In computer-implemented flight simulator systems, the same types of flight control are often simulated by software.

DESCRIPTION OF DRAWINGS

FIG. 3 is a schematic diagram, in top view, of a portion of an example handheld controller device showing an example trigger assembly with linear (or extension) springs as biasing elements.

DETAILED DESCRIPTION

Figure 1A:
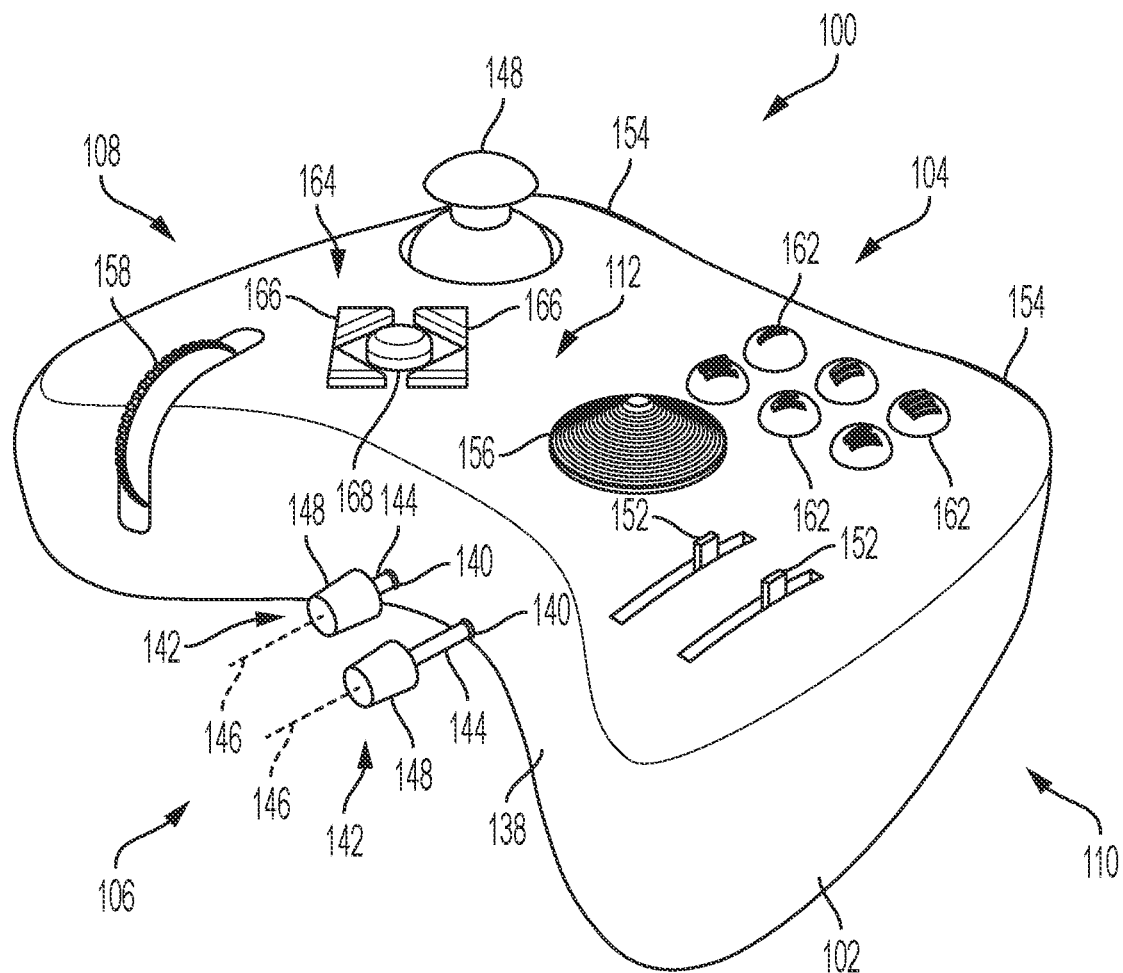
FIG. 1A is a schematic diagram, in rear perspective view, of an example handheld controller device for controlling a simulated or remotely controlled aircraft.

In a general aspect, handheld devices provide aircraft control data based on input from a user of the handheld device. In some cases, the handheld devices can be used in a computer-implemented flight simulator system, and the aircraft control data are provided to a computing device (or computer system) running a flight simulation (e.g., to control a simulated aircraft). In some cases, the handheld devices can be used in connection with a remotely controlled aircraft, and the aircraft control data are provided to the aircraft to control the aircraft remotely. A handheld device may include input devices or mechanisms that are configured to provide control functionality similar to the components in the cockpit of an aircraft. The input devices or mechanisms may interact with the fingers or thumbs of a user to generate aircraft control data for the simulated or remotely controlled aircraft. Examples of such input devices or mechanisms include joysticks, slidable knobs, triggers, buttons, bumper buttons, hat switches, wheels, D-pads, and so forth. In many implementations, the input devices or mechanisms can be bound and mapped to selective functions of the cockpit based on a preference or need of a user of the handheld device.

In some examples, a handheld device may also include circuitry with sensors configured to measure a position or an orientation of the input devices or mechanisms. The circuitry may include electronics that allow the handheld device to communicate with a computing device of the simulated or remotely controlled aircraft. The computing device may include one or more computing processors coupled to one or more memories. For example, the computing device may be a computer executing instructions for a flight simulator program. The computing device may also be part of a control system for a drone or unmanned aerial vehicle (UAV). Other types of computing devices are possible.

In some examples, a handheld device may provide advantages over larger systems used to control simulated or remotely controlled aircraft, especially if such systems incorporate hardware for a hands-on throttle-and-stick (HOTAS) or a yoke. These systems typically supplement such hardware with one or more additional pieces of hardware—such as rudder pedals, trim wheels, throttle quadrants, and so forth—to allow full control of the simulated or remotely controlled aircraft. The exact combination may depend on the specific aircraft to be controlled. However, the resulting assemblage of hardware is bulky and can require a considerable financial investment to acquire. In contrast, a handheld device can consolidate such bulky and expensive hardware into a single compact body that is accessible, space-friendly, and portable.

In some examples, a handheld device may provide advantages for individuals interested in flight simulation, such as on a gaming laptop, through a game streaming service, a simulation mobile app, or on a gaming console. For example, individuals new to flight simulation may see a lower cost of entry when purchasing a handheld device. Moreover, the compact nature of a handheld device may allow the individuals to avoid dedicating personal living space (e.g., an office, a bedroom, etc.) to a virtual cockpit. The compact nature of a handheld device may also allow for the control of simulated aircraft in spaces impractical for larger systems. For example, an individual may use the handheld device while lounging on a couch in a living room, whereas the deployment of HOTAS (or yoke) and pedal hardware in such spaces may be impractical. Experienced individuals may also value the portable nature of a handheld device, such as when playing flight simulation games during travel.

In some examples, a handheld device may also provide advantages in controlling remotely controlled aircraft, such as drones and unmanned aerial vehicles. For example, the compact nature of the handheld device may allow for its convenient transportation to off-site or remote areas. Such areas are typically amenable to the operation of remotely controlled flyable aircraft, as these aircraft may require flight paths through large open spaces. The off-site or remote areas may also allow for a direct line-of-sight to the remotely controlled flyable aircraft, which can be useful in ensuring that the remotely controlled flyable aircraft stays within a communication range of the handheld device. The portable nature of a handheld device may also allow a user or operator to move along with the remotely controlled flyable aircraft, such as to accommodate a desired flight path. In contrast, the deployment of multi-hardware systems off-site or in a remote area may be impractical due to their large bulk and power requirements.

In some cases, the handheld device may be in communication with a computing device during operation of a remotely controlled flyable aircraft. The computing device may include a presentation device, such as a screen, and a wireless communication interface, such as a radio. For example, the computing device could be a mobile computing device, such as laptop or a tablet. During flight, the computing device may exchange data with the remotely controlled flyable aircraft via the wireless communication interface. The data may include control data from the handheld device and possibly other types of data (e.g., image data generated by a camera on the remotely controlled flyable aircraft). The portable nature of both the handheld device and the portable computing device may allow the user improved control with the remotely controlled flyable aircraft.

In many implementations, a handheld device includes an input device or mechanism based on a counter-moving pair of triggers (or trigger pads). In particular, the handheld device may include a pair of triggers extending outward from a side (e.g., a front side, a top side, a bottom side, etc.) that are configured to move along respective trigger paths. A coupling assembly connected to the pair of triggers can transfer motion between the pair of triggers such that, when either of the pair of triggers moves along its trigger path towards a housing of the handheld device, the coupling assembly moves the other trigger an equal distance away from the housing along its respective trigger path.

The counter-moving pair of triggers may be used to control the position of one or more flight control surfaces on the simulated or remotely controlled flyable aircraft. Such control may allow the handheld device to control one or both of a direction and a speed of the simulated or remotely controlled flyable aircraft. For example, the counter-moving pair of triggers may be pivoted back and forth to move a rudder back and forth. The rudder defines one or more flight control surfaces that may influence a yaw of the simulated or remotely controlled flyable aircraft during flight. As another example, the counter-moving pair of triggers may be pivoted back and forth to move a pair of ailerons back and forth in opposing motion. The pair of ailerons define flight control surfaces that may influence a roll of the simulated or remotely controlled flyable aircraft during flight. In general, the one or more flight control surfaces may be defined by a body capable of moving continuously between two positions in order to change an aerodynamic drag or lift experienced by the simulated or remotely controlled flyable aircraft.

The yaw, pitch, and roll may correspond to rotations of an aircraft relative to a set of orthogonal axes defined by a body of the aircraft. For example, the wings of the aircraft may define a first axis of rotation associated with a pitch of the aircraft, i.e., rotation of the aircraft about the first axis of rotation alters a pitch of the aircraft. Similarly, the fuselage of the aircraft may define a second axis of rotation. The second axis of rotation passes through first axis at an intersection point and is perpendicular to the first axis. The second axis of rotation may be associated with a roll of the aircraft, i.e., rotation of the aircraft about the second axis of rotation alters a roll of the aircraft. Lastly, a third axis of rotation passes through the intersection point and is perpendicular to the first and second axes. The third axis of rotation may be associated with a yaw of the aircraft, i.e., rotation of the aircraft about the third axis of rotation alters a yaw of the aircraft. It will be appreciated that the intersection point serves as a origin for the orthogonal axes, and in certain cases, corresponds to a center of mass for the aircraft.

In some implementations, the one of more flight control surfaces are primary flight control surfaces on a fixed-wing aircraft. Examples of the primary flight control surfaces include those defined by a rudder on a vertical stabilizer, an aileron on a wing, or an elevator on a horizontal stabilizer. In some implementations, the one or more flight control surfaces are secondary flight control surfaces on the fixed-wing aircraft. Examples of the secondary flight control surfaces include those defined by a moveable structure on a wing or horizontal stabilizer, such as flap, a spoiler (or air brake), or a slat or Kruger flap. In some implementations, the one or more flight control surfaces are hybrid flight control surfaces on a fixed-wing aircraft. Examples of the hybrid flight control surfaces include an elevon, a flaperon, or a spoileron. The one or more flight control surfaces may also correspond to those on a rotary-wing aircraft, such as a helicopter. For example, the one or more flight control surfaces may be defined by a set of tail rotor blades having a selectively variable blade pitch.

Figure 1B:
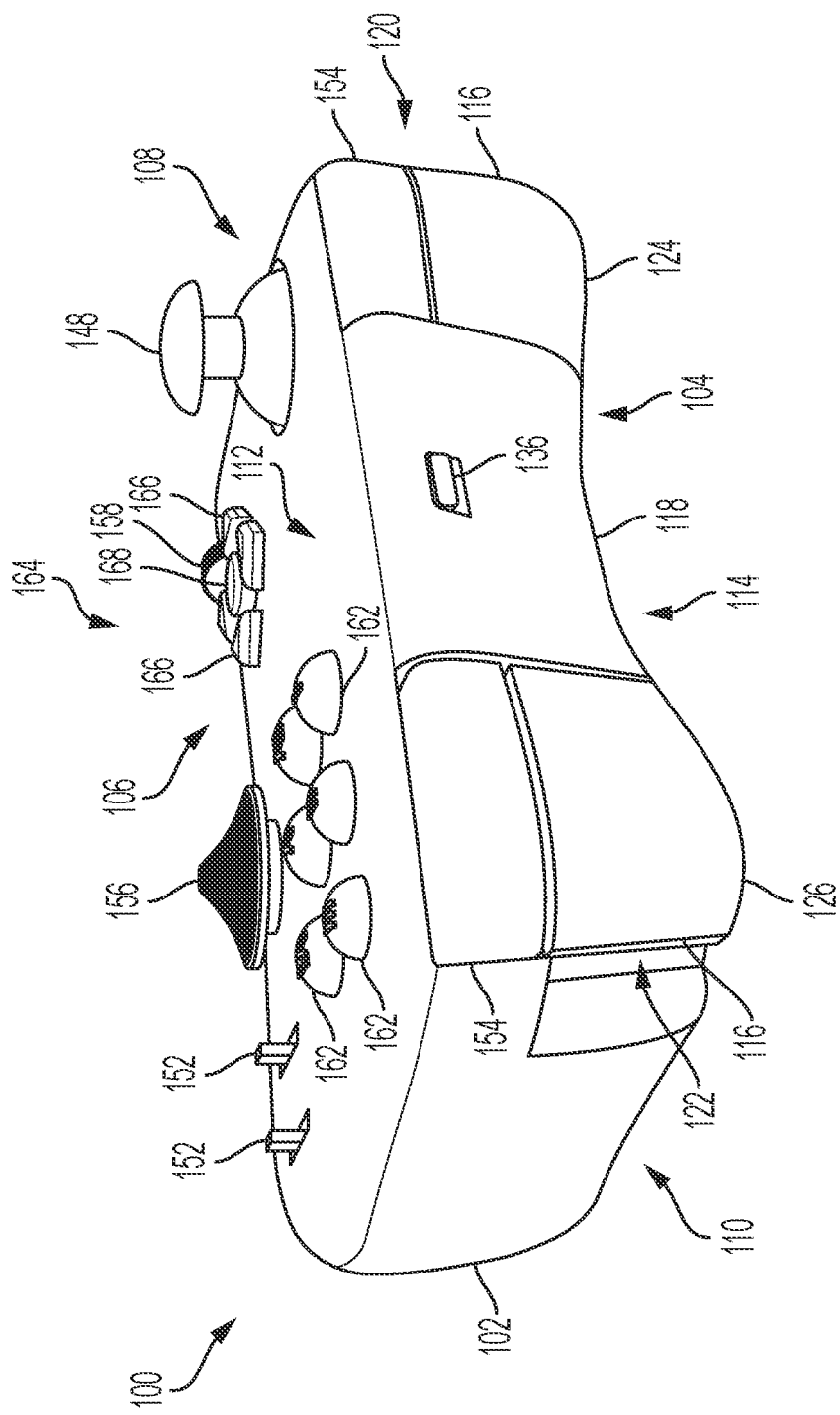
FIG. 1B is a schematic diagram of the example handheld controller device of FIG. 1A, but from a front perspective view.
Figure 1C:
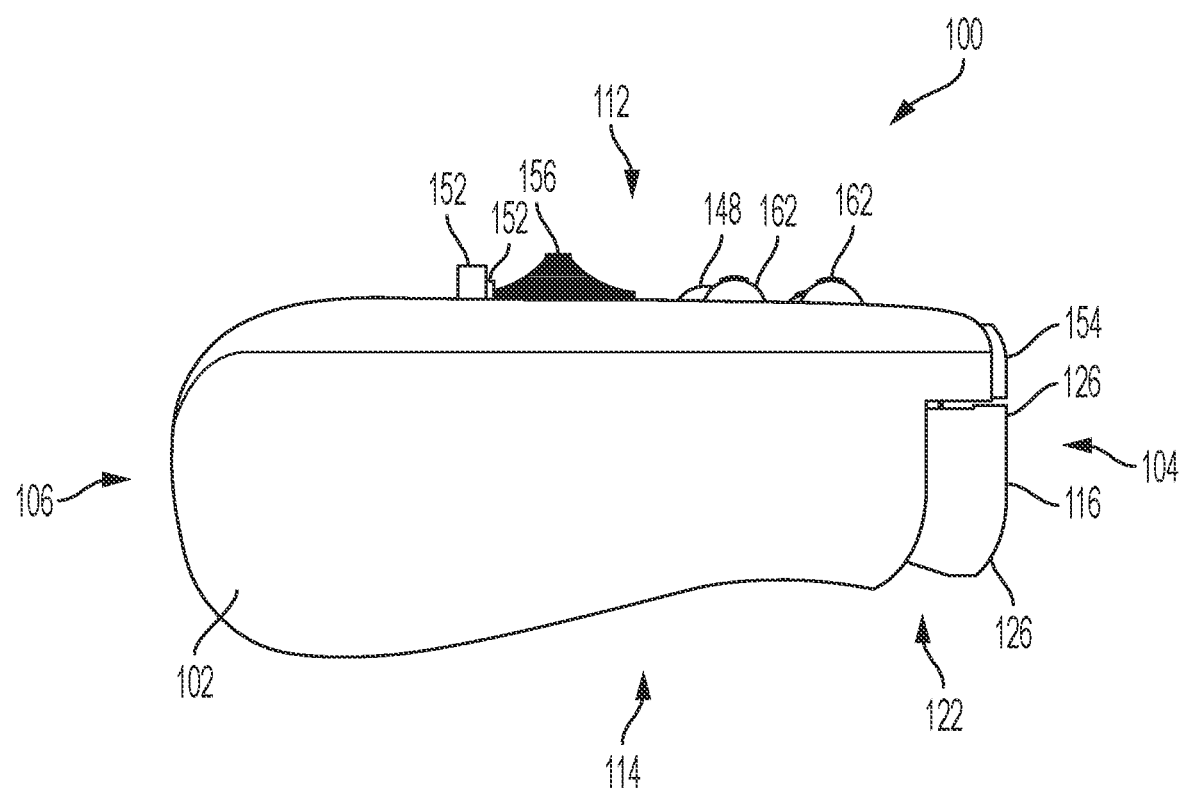
FIG. 1C is a schematic diagram of the example handheld controller device of FIG. 1A, but from a right-side view.

Now referring to FIG. 1A, a schematic diagram is presented, in a rear perspective view, of an example handheld controller device 100. The example handheld controller device may be used for controlling a simulated or remotely controlled flyable aircraft. FIGS. 1B and 1C present a schematic diagrams of the example handheld controller device 100 of FIG. 1A, but from a front perspective view and a right-side view, respectively. The example handheld controller device 100 includes a housing 102 configured to be held in the hands of a user. The housing 102 may define sides of the example handheld controller device 100, such as a front side 104, a rear side 106, a left side 108, a right side 110, a top side 112, and a bottom side 114. Other sides may be possible, depending on a shape of the housing 102. The housing 102 may be shaped ergonomically to contact one or both hands of a user during operation of the example handheld controller device 100. For example, the left side 108 and the right side 110 may be defined by contoured walls that are shaped to accommodate interior surfaces of, respectively, the left and right hands of the user (e.g., surfaces of the left and right palms).

The example handheld controller device 100 also includes input devices or mechanisms for the user to transmit commands, via the example handheld controller device 100, to the simulated or remotely controlled flyable aircraft. The commands may allow the user to control one or both of a direction and a speed of the simulated or remotely controlled flyable aircraft. Examples of the interactive devices or mechanisms include joysticks, slidable knobs, triggers, buttons, bumper buttons, hat switches, wheels, D-pads, and so forth. In many implementations, the example handheld controller device 100 includes a trigger assembly having a pair of triggers 116 extending outward from a side of the example handheld controller device 100. The pair of triggers 116 are configured to move along respective trigger paths. Although FIG. 1A depicts the pair of triggers 116 as extending outward from the front side 104, other sides are possible (e.g., the top side 112, the bottom side 114, the rear side 106, etc.). Moreover, although FIG. 1A depicts a single pair of triggers, multiple pairs of triggers are possible.

The trigger assembly also includes a coupling assembly disposed inside the housing 102 and connected to the pair of triggers 116. The coupling assembly is configured to transfer motion between the pair of triggers 116 such that, when either of the triggers 116 moves towards the housing 102 along its trigger path, the coupling assembly moves the other trigger an equal distance away from the housing 102 along its respective trigger path. In many variations, the housing 102 includes a wall 118 that defines the side (e.g., the front side 104) and has first and second openings 120, 122 therethrough. In these variations, the pair of triggers 116 includes a first trigger arm extending from a first trigger pad 124 (or first pad) into the first opening 120 and terminating in a first trigger end. The pair of triggers 116 also includes a second trigger arm extending from a second trigger pad 126 (or second pad) into the second opening 122 and terminating in a second trigger end. Representative examples of trigger assembly and the coupling assembly are described in further detail in relation to FIGS. 2A-4.

Figure 1D:
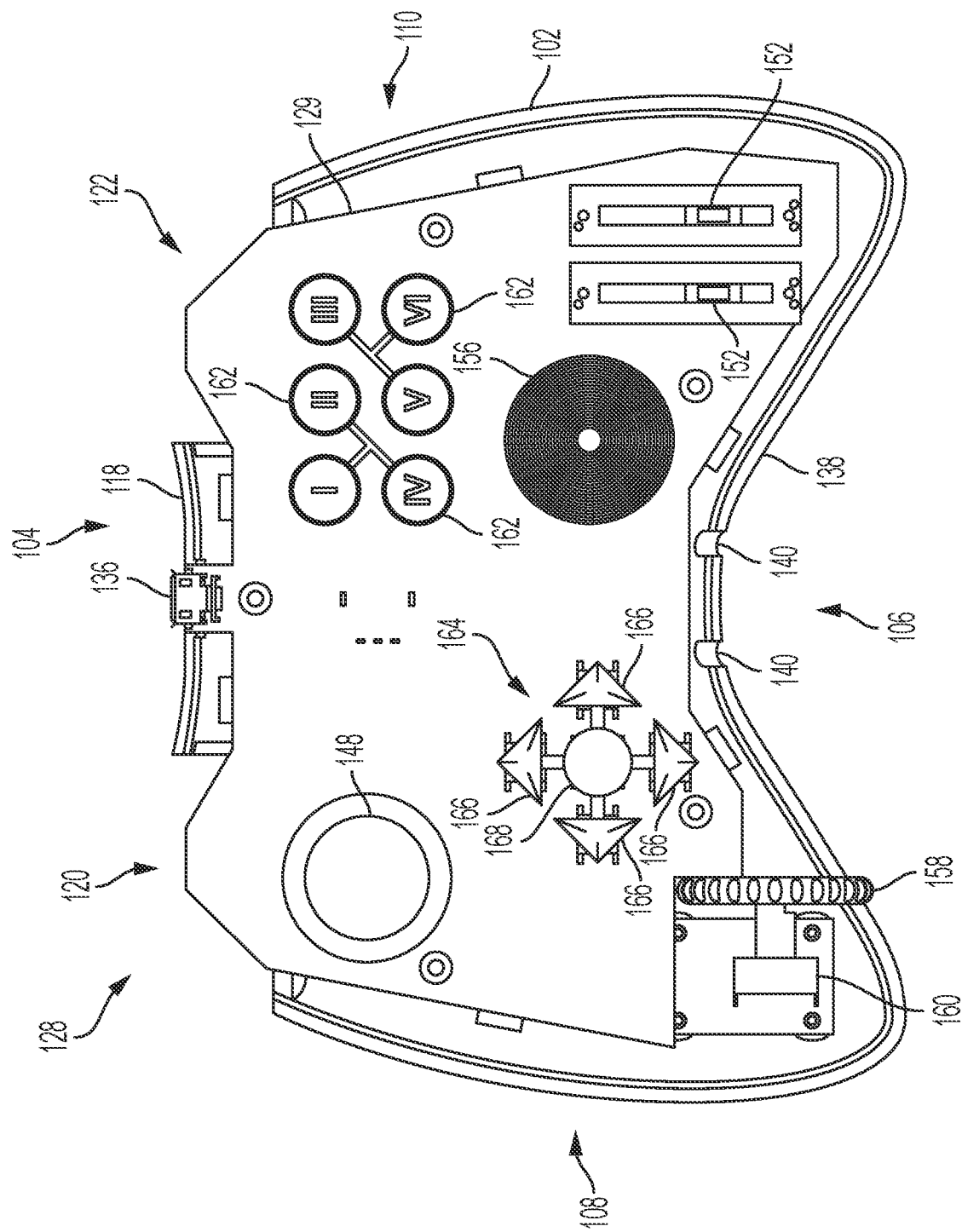
FIG. 1D is a schematic diagram, in top view, of an interior portion of the example handheld controller device of FIG. 1A.
Figure 1E:
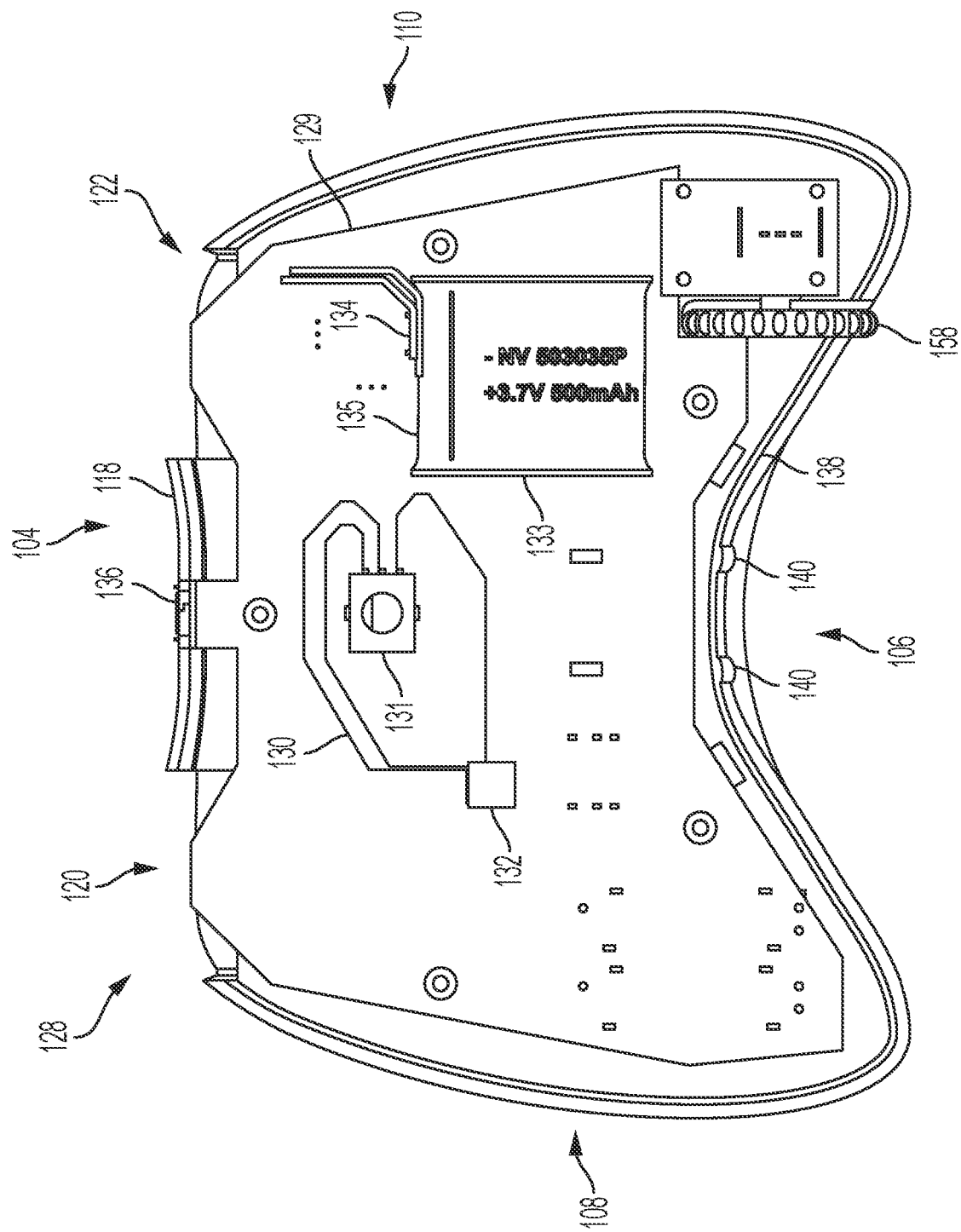
FIG. 1E is a schematic diagram, in bottom view, of the interior portion of FIG. 1D.
Figure 1F:
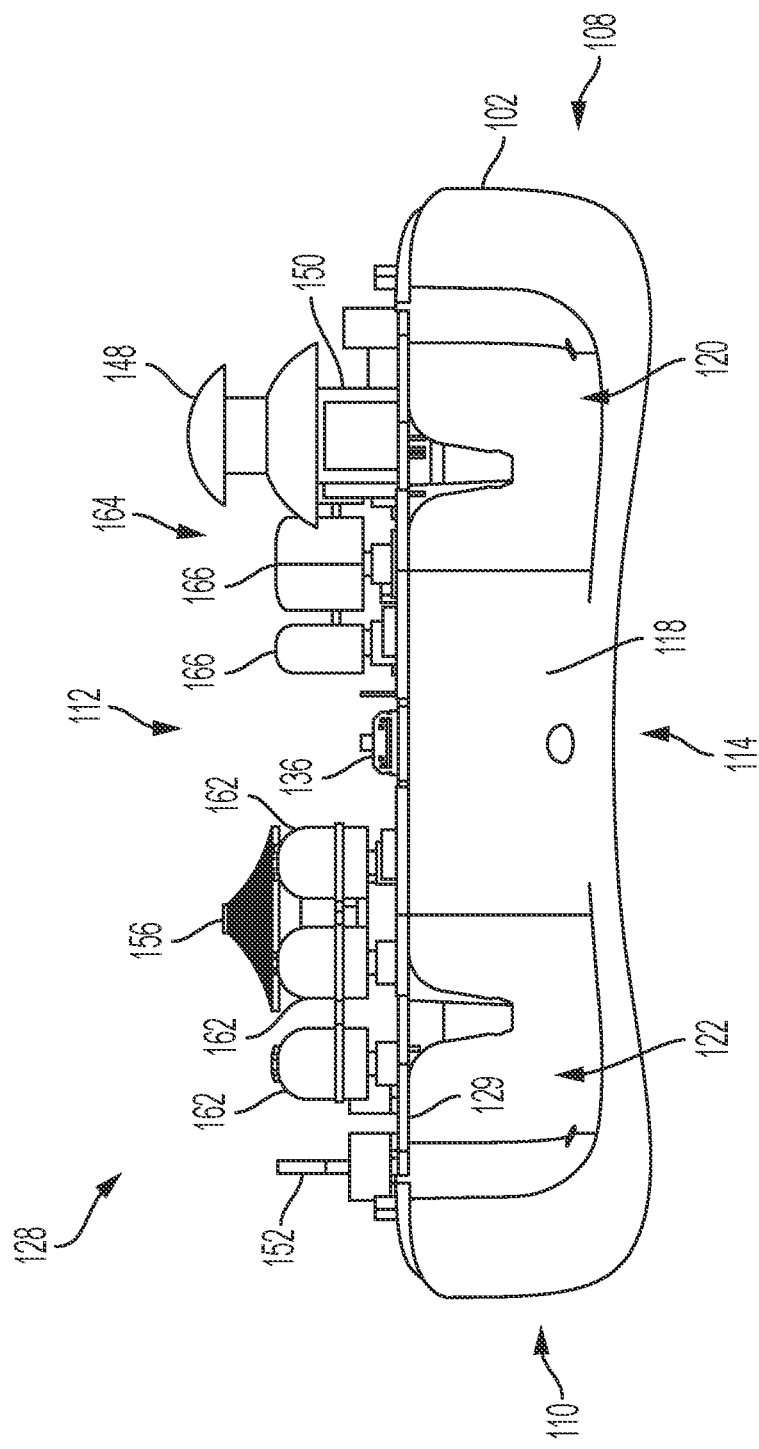
FIG. 1F is a schematic diagram, in front-side view, of the interior portion of FIG. 1D.

The example handheld controller device 100 additionally includes circuitry disposed in the housing 102, such as on a printed circuit board (PCB). FIG. 1D presents a schematic diagram, in top view, of an interior portion 128 of the example handheld controller device 100 of FIG. 1A. FIGS. 1E-1F present schematic diagrams, in respective bottom and front-side views, of the interior portion 128 of FIG. 1D. Certain features of the example handheld controller device 100 of FIG. 1A have been omitted from FIGS. 1D-1F for clarity. The interior portion 128 includes a printed circuit board 129 that provides electrically conductive traces 130 for the circuitry. For clarity, only some of the electrically conductive traces 130 are shown by FIGS. 1D-1F. The circuitry, which may comprise the electrically conductive traces 130, includes one or more sensors 131 configured to generate sensor signals based on positions of the pair of triggers 116 along their respective trigger paths. The one or more sensors 131 may sense the positions of pair of triggers 116 either directly or indirectly. For indirect sensing, the one or more sensors 131 may, for example, sense the position of a component coupled to the pair of triggers 116, such as a mechanical linkage or a magnet. Examples of the one or more sensors 131 include a rotary potentiometer or a Hall effect sensor.

The circuitry also includes a microcontroller 132 (e.g., a microprocessor) configured to receive the sensor signals and, in response, generate aircraft control data for the simulated or remotely controlled flyable aircraft. The microcontroller 132 may be electrically coupled to the one or more sensors 131 by the electrically conductive traces 130. In some variations, the circuitry includes a battery receptacle 133 having electrical contacts 134 for coupling to a battery 135, such as a primary (or non-rechargeable) or secondary (or rechargeable) battery. The battery receptacle 133 may be configured to allow the battery 135 to be removable, thereby allowing for its replacement. In FIG. 1E, the battery 135 is depicted as a secondary battery.

In some variations, the circuitry may include power control electronics configured to regulate electrical power received by the example handheld controller device 100. The power control electronics may regulate one or both of an operating voltage and an operating current needed to operate the example handheld controller device 100. For example, the power control electronics may regulate an operating voltage and an operating current for the one or more sensors 131, the microcontroller 132, or both. The power control electronics may also regulate one or both of a charging voltage and a charging current supplied to the battery receptacle 133 to charge a secondary battery. In some variations, the power control electronics allows the user to operate the example handheld controller device 100 while the secondary battery is being charged.

In some implementations, the example handheld controller device 100 includes a port 136, which may define part or all of a wired communication interface for the circuitry. The port 136 may be configured to couple to an electrical cable, such as a universal serial bus (USB) cable, an Ethernet cable, or another type of communication channel. The electrical cable, when plugged into the port 136, may allow electrical signals to be transmitted between the example handheld controller device 100 and a computing device, such as a gaming console, a desktop computer, a laptop computer, a smartphone, a tablet, a gamepad with integrated display, and so forth. The electrical signals may represent data, such as aircraft control data for controlling the simulated or remotely controlled flyable aircraft. The computing device includes one or more computer processors that can execute software, firmware, or a combination thereof. For instance, the computing device can be a computer configured to execute instructions of a flight simulator program for the simulated aircraft. In some cases, the computing device is part of the control system for a remotely controlled flyable aircraft. The electrical cable may also serve as a conduit of electrical power to the example handheld controller device 100. In such cases, the port 136 may be electrically coupled to the power control electronics of the circuitry. Such coupling may allow the port 136 to supply power to example handheld controller device 100, such as for operation of the example handheld controller device 100 and charging of a secondary battery in the example handheld controller device 100.

In some implementations, the example handheld controller device 100 includes a transceiver (or radio), which may define part or all of a wireless communication interface for the circuitry. The transceiver may be configured to send and receive wireless signals (e.g., radio frequency signals) representing data, such as aircraft control data for controlling the simulated or remotely controlled flyable aircraft. The wireless signals may be transmitted between the example handheld controller device 100 and a computing device, such as a gaming console, a desktop computer, a laptop computer, a smartphone, a tablet, a gamepad with integrated display, and so forth. In some cases, the transceiver is configured send wireless signals according to a short-range communication standard, such as BLUETOOTH®, Near Field Communication (NFC), or ZigBee. In other cases, the transceiver is configured to send wireless signals according to one or more of the 802.11 family of standards developed by IEEE (e.g., a Wi-Fi network standard). In yet other cases, the transceiver is configured send wireless signals according to a cellular network standard. Examples of such standards include 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and 5G standards. Other wireless signal standards are possible. Moreover, the example handheld controller device 100 may include multiple transceivers, each dedicated to a single wireless signal standard.

During operation, the example handheld controller device 100 is placed in communication with an external computing device using one or both of the wired or wireless communication interfaces. In cases where the example handheld controller device 100 controls a simulated aircraft, the computing device may be a computer configured to execute instructions of a flight simulator program. The computer may be a gaming console, such as a desktop computer, a laptop computer, a smartphone, a tablet, a gamepad with integrated display, and so forth. In cases where the example handheld controller device 100 controls a remotely controlled flyable aircraft, the computing device may be part of a control system of the remotely controlled flyable aircraft and may be in communication with an actuator subsystem of the control system. For example, the computing device may include one or more computer processors in communication with the actuator subsystem. The actuator subsystem may be configured to move a moveable body that defines one or more physical flight control surfaces for the remotely controlled flyable aircraft.

The user of the example handheld controller device 100 may displace the pair of triggers 116 along their respective trigger paths in opposite directions. As either of the triggers moves towards the housing 102 along its trigger path, the coupling assembly moves the other trigger an equal distance away from the housing 102 along its respective trigger path. In response, the one or more sensors 131 generate sensor signals based on the positions of the pair of triggers 116 along their respective paths. The positions of the pair of triggers 116 may be sensed by the one or more sensors 131 either directly or indirectly. The microcontroller 132 then receives the sensor signals and generates aircraft control data for the simulated or remotely controlled flyable aircraft. The aircraft control data is transmitted to the computing device, where the aircraft control data is used to alter the position of one or more flight surfaces of the simulated or remotely controlled flyable aircraft. In many variations, the user configures the computing device in advance to associate the aircraft control data with one or more target flight control surfaces (or a body defining the one or more target flight control surfaces), thereby allowing the pair of triggers 116 to control a yaw, a pitch, or a roll of the simulated or remotely controlled flyable aircraft.

In some instances, the aircraft control data is associated with one or more flight control surfaces controlling a yaw of the simulated or remotely controlled flyable aircraft. For example, the one or more flight control surfaces may be defined by a rudder located on a trailing edge of a vertical stabilizer. The one or more flight control surfaces may also be defined by a tail rotor blade located on a tail of a helicopter. In some instances, the aircraft control data is associated with one or more flight control surfaces controlling a pitch of the simulated or remotely controlled flyable aircraft. For example, the one or more flight control surfaces may be defined by a pair of elevators located on a trailing edge of a horizontal stabilizer and on opposite sides of the horizontal stabilizer. In some instances, the aircraft control data is associated with one or more flight control surfaces controlling a roll of the simulated or remotely controlled flyable aircraft. For example, the one or more flight control surfaces may be defined by a pair of ailerons located on, respectively, left- and right-side wings of the simulated or remotely controlled flyable aircraft. In some instances, the aircraft control data is associated with other flight control surfaces, such as secondary and hybrid flight control surfaces.

If the example handheld controller device 100 is used to control a simulated aircraft, the one or more control surfaces may correspond to simulated flight control surfaces of the simulated aircraft. In this case, the computing device may generate graphical data based on the position (or altered position) of the one or more simulated flight control surfaces. The graphical data may represent a position and an orientation of the simulated aircraft in a simulated environment. If the example handheld controller device 100 is used to control a remotely controlled flyable aircraft, the one or more control surfaces may correspond to physical flight control surfaces of the remotely controlled flyable aircraft. In this latter case, the computing device (or one or more computer processors) may generate motion signals based on the aircraft control data from the example handheld controller device 100. The motion signals may then be sent to the actuator subsystem, which in turn, moves a moveable body (or bodies) that defines the one or more physical flight control surfaces.

The example handheld controller device 100 may include other input devices or mechanisms for controlling the simulated or remotely controlled flyable aircraft. In some implementations, the housing 102 of the example handheld controller device 100 includes a wall 138 having a hole 140 therethrough. FIG. 1A depicts the wall 138 as defining the rear side 106 of the housing 102 but other sides are possible. In these implementations, the example handheld controller device 100 includes a slider assembly 142 having a shaft 144 disposed through the hole 140 and configured to move along a slider path 146. Moreover, the circuitry includes a second sensor configured to generate second sensor signals based on a position of the slider assembly 142, and the microcontroller 132 is further configured to receive the second sensor signals and, in response, generate second aircraft control data for the simulated or remotely controlled flyable aircraft. Although FIG. 1A depicts the example handheld controller device 100 as having two slider assemblies 142, other numbers of slider assemblies are possible (e.g., one, three, etc.). In certain instances, such as shown in FIG. 1A, the slider assemblies 142 each include a knob 148 connected to the shaft 144 outside of the housing 102.

During operation, the user of the example handheld controller device 100 may pull or push the slider assembly 142 along the slider path 146. In response, the second sensor generates second sensor signals based on a position of the slider assembly 142. The microcontroller 132 then receives the second sensor signals and generates the second aircraft control data for the simulated or remotely controlled flyable aircraft. The second aircraft control data is transmitted to the computing device, where the second aircraft control data is used to alter a flight control parameter of the simulated or remotely controlled flyable aircraft. The flight control parameter may represent an operational characteristic of the simulated or remotely controlled flyable aircraft. For example, the flight control parameter may be a throttle for an engine of the simulated or remotely controlled flyable aircraft. As another example, the flight control parameter may be an air-to-fuel mixture for an engine of the simulated or remotely controlled flyable aircraft. In yet another example, the flight control parameter may be an angle of attack for propeller blades of the simulated or remotely controlled flyable aircraft. The angle of attack may influence a rotational speed of the propeller blades.

In some implementations, the example handheld controller device 100 includes a finger joystick 148 and corresponding sensor 150 that allows the user to control a pitch and a roll of the simulated or remotely controlled flyable aircraft. For example, a vertical motion of the finger joystick 148 may control the pitch and a horizontal motion of the finger joystick 148 may control the roll. The vertical motion may occur along a direction extending from the front side 104 of the housing 102 to a rear side 106 of the housing 102. The horizontal motion may occur along a direction extending from a left side 108 of the housing 102 to a right side 110 of the housing 102.

In some implementations, the example handheld controller device 100 includes a slider 152 and corresponding sensor that can be assigned to various flight control parameters. The slider 152 may be analog input device. Examples of the flight control parameters include a radio frequency for communicating with air traffic control, an angular velocity of a propeller, a cockpit light brightness, a throttle for an aircraft engine, an air-to-fuel mixture for an aircraft engine, an angle of attack for a propeller blade, and so forth. In some instances, the slider 152 and corresponding sensor may be assigned to one or more secondary flight control surfaces, such as a flap on a wing. The flap may help the user maintain control of the simulated or remotely controlled flyable aircraft in low-speed conditions (e.g., during takeoff and landing).

In some implementations, the example handheld controller device 100 includes a bumper button 154 and corresponding sensor. The bumper button 154 may reside on a same side of the housing 102 as the pair of triggers 116, such as shown in FIGS. 1A-1C. Moreover, the bumper button 154 may reside above a trigger 116 and be flush therewith. The user may assign the bumper button 154 to a flight control parameter of the simulated or remotely controlled flyable aircraft, such a state of a parking brake (e.g., engaged or disengaged), the firing of ordnance or weaponry, or a state of an autopilot function (e.g., on or off). For applications involving flight simulation, the user may also assign the bumper button 154 to interact with a graphical user interface (GUI), such as selecting a degree of camera zoom displayed by the graphical user interface.

In some implementations, the example handheld controller device 100 includes a hat switch 156 and corresponding sensor. The hat switch 156 may be configured as a directional control that moves in four directions, for example, from a default position towards the front side 104, the rear side 106, the left side 108, and the right side 110, respectively. For applications involving flight simulation, the user may assign the hat switch 156 to interact with a graphical user interface, such as selecting a target displayed on the graphical user interface or changing between camera views of the graphical user interface.

In some implementations, the example handheld controller device 100 includes a wheel 158 and corresponding sensor 160 (e.g., a rotary encoder). The wheel 158 may be configured to hold a target wheel position after the user disengages their finger or thumb from the wheel 158. In this configuration, the wheel 158 may relieve the user from having to maintain an orientation (e.g., a pitch) of the simulated or remotely controlled flyable aircraft during flight. For example, by using the wheel 158 instead of the finger joystick 148, the user may avoid having to persistently hold the finger joystick 148 in a canted position to maintain a pitch of the simulated or remotely controlled flyable aircraft. In some instances, the user may assign the wheel 158 to control one or more flight surfaces defined by an elevator (or pair of elevators). The user may thereafter turn the wheel 158 up or down to alter a position of the elevator, thereby raising and lowering a nose of the simulated or remotely controlled flyable aircraft, respectively. Moreover, the user may leave the wheel 158 at a target wheel position to maintain the elevator at a desired position. The desired position of the elevator may counteract a tendency of the nose to dive in response to aerodynamic forces on the simulated or remotely controlled flyable aircraft during flight.

In some implementations, the example handheld controller device 100 includes a button 162 (or an array thereof), which serves as a digital input device. The button 162 is coupled to a button sensor, and the user may assign the button 162 to an arbitrary function based on preference. In some implementations, the example handheld controller device 100 includes a directional pad (or D-pad) 164 having a plurality of arrow buttons 166 and a central button 168. Each button in the directional pad 164 may be coupled to a respective button sensor. The plurality of arrow buttons 166 may include fours arrow buttons pointing to, respectively, the front-side 104, the rear-side 106, the left-side 108, and the right-side 110 of the example handheld controller device 100. The user may assign the directional pad 164 to control an autopilot functionality or altitude of the simulated or remotely controlled flyable aircraft. For example, the left and right arrow buttons, when pressed, may increment an autopilot heading, and the front and rear arrow buttons, when pressed may increment the altitude. For applications involving flight simulation, the user may assign the directional pad 164 to interact with a graphical user interface, such as selecting a camera or a camera view.

Although the input devices and mechanisms referenced above have be described in the context of certain assigned functions, it will be appreciated that these input devices and mechanisms may be assigned to other functions, as determined by the user. For example, multiple input devices and mechanisms may be applicable for assignment to a specific function of the simulated or remotely controlled flyable aircraft. However, the user may prefer a particular input device or mechanism for the specific function. The example handheld controller device 100 allows the user to make such custom assignments.

Figure 1G:
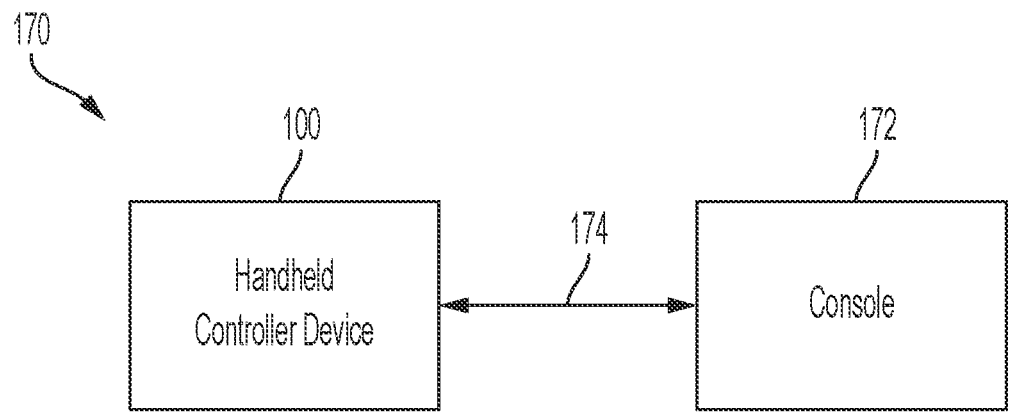
FIG. 1G is a block diagram of an example flight simulator system that includes the example handheld controller device of FIG. 1A and a console.

Now referring to FIG. 1G, a block diagram is presented of an example flight simulator system 170 that includes the example handheld controller device 100 of FIG. 1A and a console 172 (or gaming console). The console 172 may include one or more computer processors and may be configured to execute instructions of a flight simulator program. Examples of the console 172 include computing devices such as a workstation computer, a server computer, desktop computer, a laptop computer, a smartphone, a tablet, a gamepad with integrated display, and so forth. The example flight simulator system 170 also includes one or more communication channels 174 between the example handheld controller device 100 and the console 172. The one or more communication channels 174 may include unidirectional or bidirectional communication channels. FIG. 1G depicts the one or more communication channels 174 as a single bidirectional communication channel. In some variations, the one or more communication channels 174 include a wired communication link between the example handheld controller device 100 and the console 172. The wired communication link may connect a first wired communication interface of the example handheld controller device 100 (e.g., port 136) to a second wired communication interface of the console 172. In some variations, the one or more communication channels 174 include a wireless communication link between the example handheld controller device 100 and the console 172. The wireless communication link may connect a first wireless communication interface of the example handheld controller device 100 to a second wireless communication interface of the console 172.

Figure 1H:
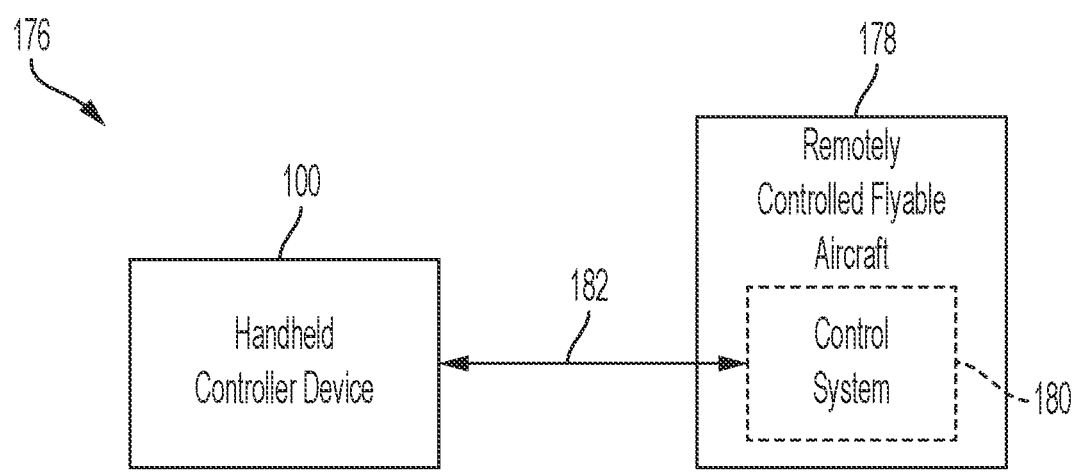
FIG. 1H is a block diagram of an example remote control system that includes the example handheld controller device of FIG. 1A and a remotely controlled flyable aircraft.

Now referring to FIG. 1H, a block diagram is presented of an example remote control system 176 that includes the example handheld controller device 100 of FIG. 1A and a remotely controlled flyable aircraft 178. The remotely controlled flyable aircraft 178 includes a control system 180 having one or more computer processors. The example remote control system 176 also includes one or more communication channels 182 between the example handheld controller device 100 and the control system 180 of the remotely controlled flyable aircraft 178. The one or more communication channels 182 may include unidirectional or bidirectional communication channels. FIG. 1H depicts the one or more communication channels 182 as a single bidirectional communication channel. In some variations, the one or more communication channels 182 include a wired communication link between the example handheld controller device 100 and the control system 180 of the remotely controlled flyable aircraft 178. The wired communication link may connect a first wired communication interface of the example handheld controller device 100 (e.g., port 136) to a second wired communication interface of the control system 180. In some instances, the one or more communication channels 182 include a wireless communication link between the example handheld controller device 100 and the control system 180 of the remotely controlled flyable aircraft 178. The wireless communication link may connect a first wireless communication interface of the example handheld controller device 100 to a second wireless communication interface of the control system 180.

Figure 2A:
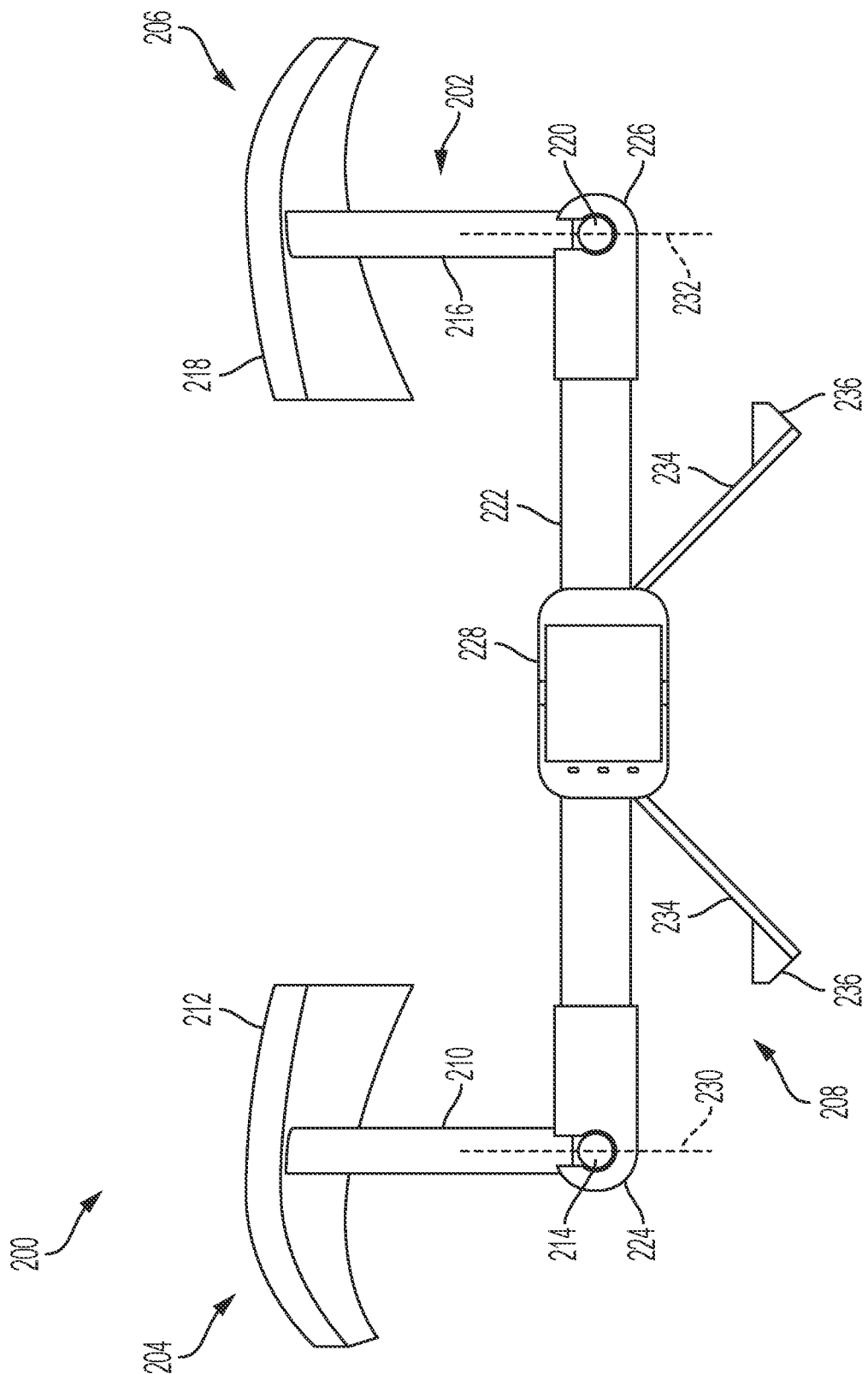
FIG. 2A is a schematic diagram is presented, in top view, of a portion of an example handheld controller device showing an example trigger assembly.

Now referring to FIG. 2A, a schematic diagram is presented, in top view, of a portion 200 of an example handheld controller device showing an example trigger assembly 202. The example trigger assembly 202 may be analogous to the trigger assembly described in relation to the example handheld controller device 100 of FIGS. 1A-1D. The example trigger assembly 202 includes a pair of triggers 204, 206 and a coupling assembly 208. A first 204 of the pair of triggers includes a first trigger arm 210 extending from a first trigger pad 212 into a first opening of a housing (not shown) and terminating in a first trigger end 214. A second 206 of the pair of triggers includes a second trigger arm 216 extending from a second trigger pad 218 into a second opening of a housing (not shown) and terminating in a second trigger end 220. The coupling assembly 208 includes a linkage 222 disposed in the housing and extending between first and second linkage ends 224, 226. The first and second linkage ends 224, 226 are rotatably coupled to, respectively, the first and second trigger ends 214, 220. The coupling assembly 208 also includes a swivel joint 228 coupling the linkage 222 to the housing. The swivel joint 228 may be connected to the linkage 222 between the first and second linkage ends 224, 226. Such connection may be at a midpoint of the linkage 222, as shown in FIG. 2A. However, other locations are possible.

In some instances, the one or more sensors may include a rotary potentiometer for sensing a position of the linkage 222 about the swivel joint 228 (e.g., to allow indirect sensing of a position of the pair of triggers 204, 206). In some instances, the rotary potentiometer may be coupled to the linkage 222 at the swivel joint 228. In some instances, the one or more sensors may include Hall effect sensor for sensing a position or orientation of the linkage 222 about the swivel joint 228 (e.g., to allow indirect sensing of a position of the pair of triggers 204, 206). In such instances, the Hall effect sensor may be placed proximate a magnet coupled to the linkage 222. The magnet may, for example, be coupled to the linkage 222 near one of the first and second linkage ends 224, 226, or alternatively, at the swivel joint 228. Other locations are possible.

In some variations, the first trigger 204 has a first travel path 230 and a first default position thereon. Similarly, the second trigger 206 has a second travel path 232 and a second default position thereon. In many instances, the first and second default positions are midway along, respectively, the first and second travel paths 230, 232. FIG. 2A depicts the first and second triggers 204, 206 in their respective default positions. However, although FIG. 2A depicts the first and second travel paths 230, 232 as being straight, the first and second travel paths 230, 232 may be angled or curved, whether in whole or in part. A shape of the first and second travel paths 230, 232 may depend on a configuration of the first and second triggers 204, 206 and the linkage 222, which influences a relative motion therebetween. In some instances, the first and second triggers 204, 206 and the linkage 222 are configured to provide straight (or substantially straight) first and second travel paths 230, 232.

Figure 2B:
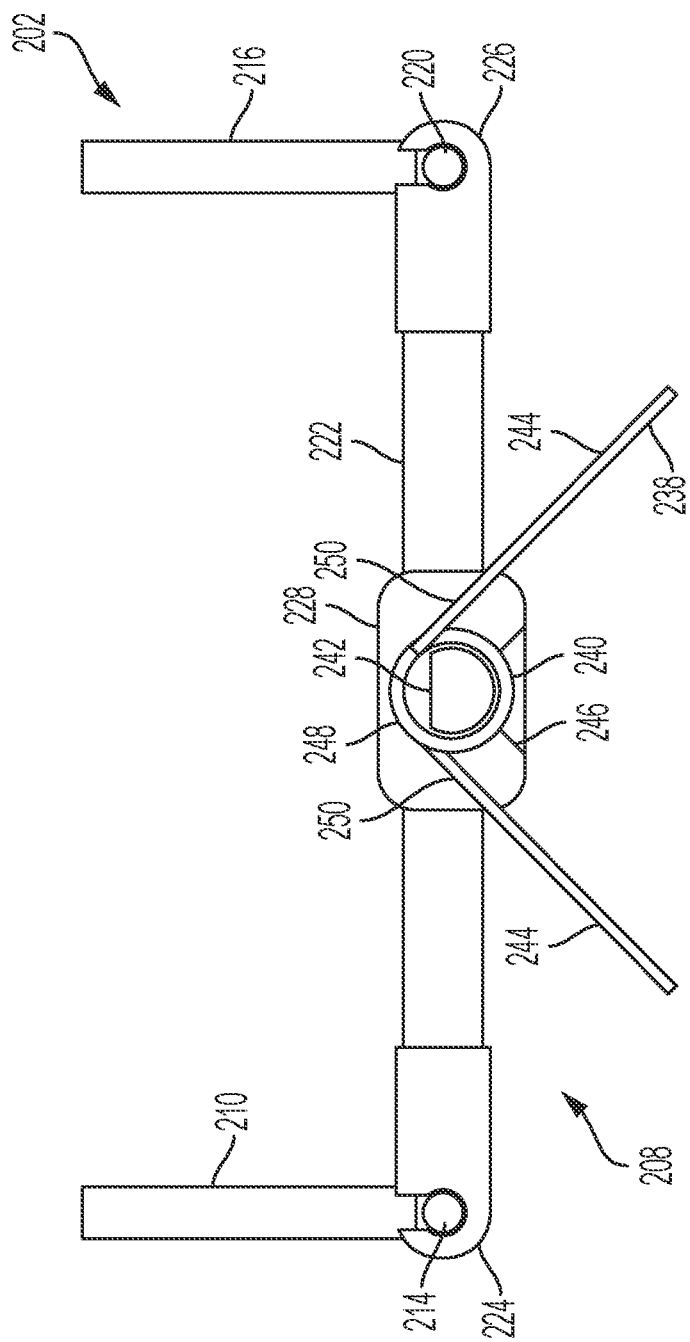
FIG. 2B is a schematic diagram, in top view, of the portion of the example handheld controller device of FIG. 2A, but with an internal portion of a swivel joint exposed to show a torsion spring.

In these variations, the example trigger assembly 202 may include one or more biasing elements 234 (e.g., springs, magnets, elastic bands, etc.) in the housing configured to bias the first and second triggers 204, 206 towards the first and second default positions, respectively. For example, the one or more biasing elements 234 may be a torsion spring or curved wire (e.g., a music wire) having ends disposed against respective support structures 236 (e.g., columns or posts). The support structures 236 may be coupled to (or part of) the housing. FIG. 2B presents a schematic diagram, in top view, of the portion 200 of the example handheld controller device of FIG. 2A, but with an internal portion of the swivel joint 228 exposed to show a torsion spring 238. Certain features of the example handheld controller device of FIG. 2A have been omitted from FIG. 2B for purposes of clarity. The torsion spring 238 has a coiled portion 240 disposed around a shaft 242, which extends from the housing. Extensions 244 of the torsion spring 238 are seated in a V-shaped channel 246 of the linkage 222. The linkage 222 includes a through-hole 248, in which, the shaft 242 resides. The through-hole 248 is nested within the V-shaped channel 246, and with the shaft 242, assists in defining the swivel joint 228. The V-shaped channel 246 may include side walls 250 that contact the extensions 244 when the linkage 222 pivots about the shaft 242. Such contact may induce a tension in the torsion spring 238 that resists motion of the linkage 222 from a default position.

Figure 2C:
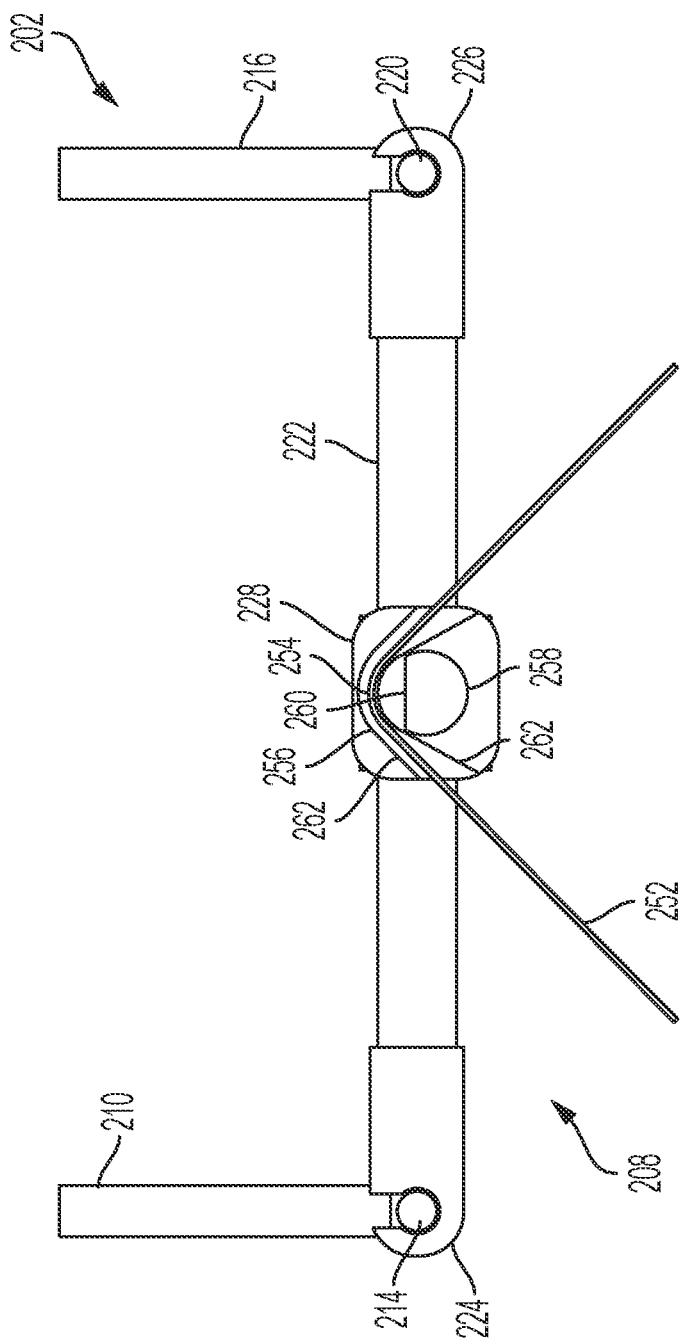
FIG. 2C is a schematic diagram a schematic diagram, in top view, of the portion of the example handheld controller device of FIG. 2A, but with an internal portion of a swivel joint exposed to show a curved wire.
Figure 2D:
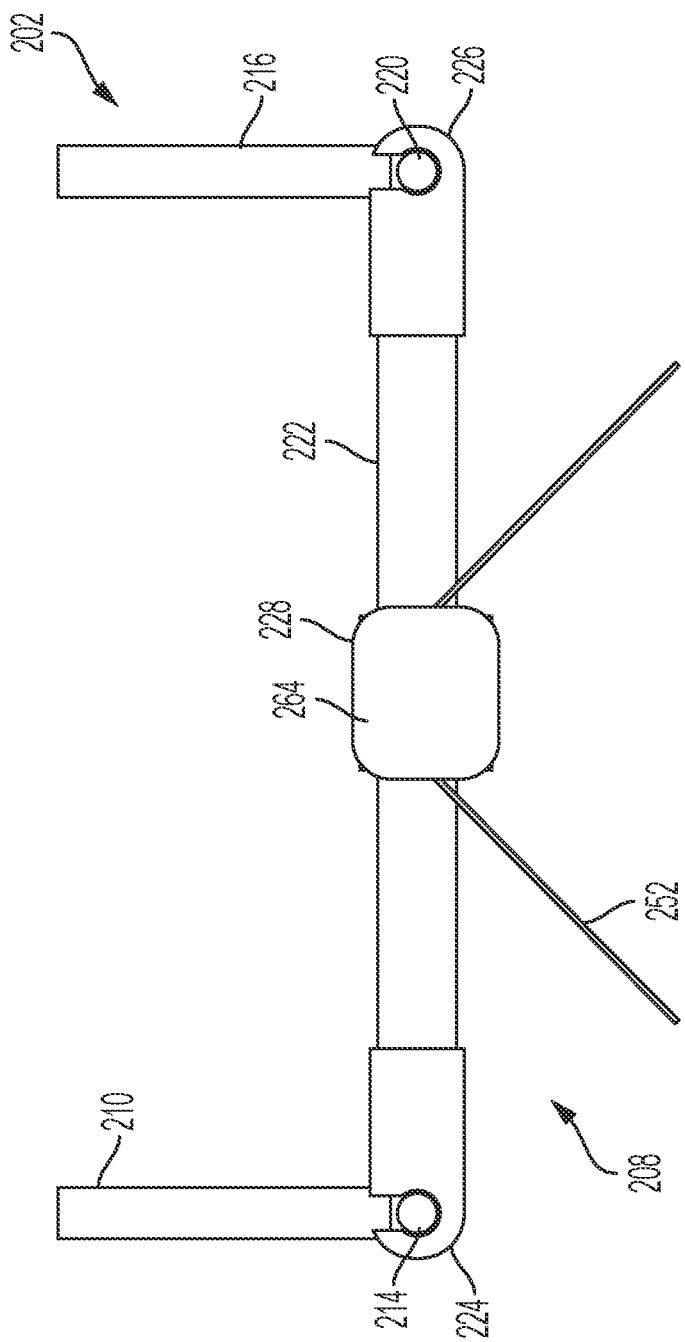
FIG. 2D a schematic diagram, in top view, of the portion of the example handheld controller device of FIG. 2C, but with a lid covering the swivel joint.

FIG. 2C presents a schematic diagram, in top view, of the portion 200 of the example handheld controller device of FIG. 2A, but with an internal portion of the swivel joint 228 exposed to show a curved wire 252 (e.g., a music wire). Certain features of the example handheld controller device of FIG. 2A have been omitted from FIG. 2C for purposes of clarity. The curved wire 252 has a bent or kinked portion 254 disposed in a channel 256 of the linkage 222. The channel 256 follows a curved path around a through-hole 258 of the linkage 222. Like FIG. 2A, a shaft 260 extends from the housing through the through-hole 258 to assist in defining the swivel joint 228. The channel 256 may include side walls 262 that contact the curved wire 252 when the linkage 222 pivots about the shaft 260. Such contact may induce a tension in the curved wire 252 that resists motion of the linkage 222 from a default position. FIG. 2D presents a schematic diagram, in top view, of the portion 200 of the example handheld controller device in FIG. 2C, but with a lid 264 covering the swivel joint 228.

Other means may be used to resist the motion of the linkage 222 from a default position and thereby establish the first and second default positions. FIG. 3 presents a schematic diagram, in top view, of a portion 300 of an example handheld controller device showing an example trigger assembly 302 with linear (or extension) springs 338, 340 as biasing elements. Features analogous to both FIGS. 3 and 2A are related via coordinated numerals that differ in increment by one hundred. Each linear spring 338, 340 has a first end 342 coupled to the linkage 322 and a second end 344 coupled to a mount point 346. The mount point 346 may be part of the housing or correspond to a separate body coupled to the housing. FIG. 3 depicts the first ends 342a, 342b of the linear springs 338, 340 coupled to the linkage 322 adjacent the first and second linkage ends 324, 326. However, other locations are possible. Moreover, although FIG. 3 depicts two linear springs, other numbers of linear springs are possible (e.g., one, three, etc.). The linear springs 338, 340 are operable to apply a force proximate each end of the linkage 322. The symmetrical coupling points of the linear springs 338 (relative to the swivel joint 328) allow their respective forces applied to the linkage 322 to balance. Such balance may establish a default position for the linkage 222. However, when the linkage 322 moves away from the default position, the linear springs 338 exert a counter torque that resists this motion, thereby biasing the linkage 322 towards the default position.

Figure 4:
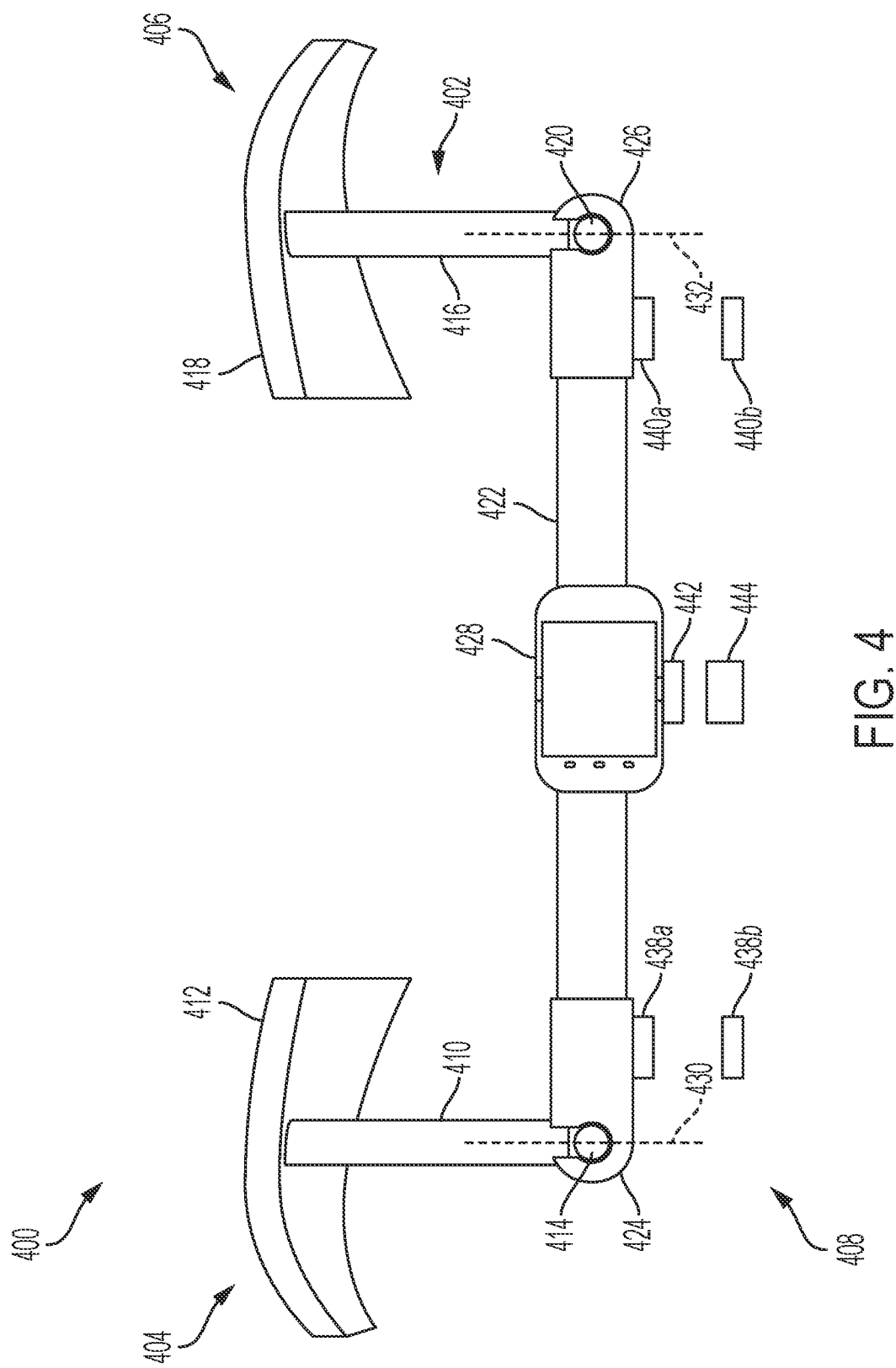
FIG. 4 is a schematic diagram, in top view, of a portion of an example handheld controller device showing an example trigger assembly with two pairs of magnets as biasing elements.

The biasing elements may rely on forces other than mechanical forces. For example, FIG. 4 presents a schematic diagram, in top view, of a portion 400 of an example handheld controller device showing an example trigger assembly 402 with two pairs of magnets 438, 440 as biasing elements. Features analogous to both FIGS. 4 and 2A are related via coordinated numerals that differ in increment by two hundred. The first pair of magnets 438 has a first magnet 438a coupled to the linkage 422 proximate the first linkage end 424 and a second magnet 438b coupled to a first mount point (not shown). The first magnet 438a and the second magnet 438b are separated from each other by a distance and may be oriented to have their respective magnetic poles establish a first magnetic repelling force. Similarly, the second pair of magnets 440 has a first magnet 440a coupled to the linkage 422 proximate the second linkage end 426 and a second magnet 440b coupled to a second mount point (not shown). The first magnet 440a and the second magnet 440b are separated from each other by a distance and may be oriented to have their respective magnetic poles establish a second magnetic repelling force. The symmetrical coupling points of the first magnets 438a, 440a (relative to the swivel joint 428) allows the first and second magnetic repelling forces applied to the linkage 422 to balance. Such balance may establish a default position for the linkage 222. However, when the linkage 422 moves away from the default position, one of the two pair of magnets 438, 440 exert a counter torque that resists this motion, thereby biasing the linkage 322 towards the default position.

In some variations, the example trigger assembly 402 may include a sensor magnet 442 coupled to the linkage 422, such as proximate one of the linkage ends 424, 426 or the swivel joint 428. FIG. 4 depicts the sensor magnet 442 as coupled to a center of the swivel joint 428. Other locations, however, are possible. In these variations, the one or more sensors may include a Hall effect sensor 444 placed at a target distance from the sensor magnet 442. The Hall effect sensor 444 may be configured to measure a change in magnetic field strength relative to a reference magnetic field strength. Such change may occur when the sensor magnet 442 rotates about the swivel joint 428, thereby changing a distance and an orientation of the sensor magnet 442 relative to the Hall effect sensor 444. In response, the Hall effect sensor 444 generates sensor signals representing an angular displacement of the linkage 422 about the swivel joint 428. These sensor signals may be interpreted by a microcontroller (e.g., the microcontroller 132 of FIG. 1E) to determine the positions of the pair of triggers 404, 406 along their respective travel paths 430, 432.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, e.g., one or more modules of computer program instructions, encoded on a computer storage medium for execution by, or to control the operation of, a computing device. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a computing device on data stored on one or more computer-readable storage devices or received from other sources.

The term "computing device" (or "data processing apparatus") encompasses all kinds of apparatus, devices, and machines for processing data, including by way of example a programmable processor, a computer, a system on a chip, or multiple ones, or combinations, of the foregoing. The computing device can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer (or computing device) or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In some aspects of what is described, a handheld controller device may be described by the following examples:

Example 1. A handheld controller device, comprising:
a housing configured to be held in the hands of a user;
a trigger assembly comprising:
a pair of triggers extending outward from a side of the handheld controller device, the pair triggers being configured to move along respective trigger paths, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path; and circuitry disposed in the housing and comprising:
one or more sensors configured to generate sensor signals based on positions of the pair of triggers along their respective trigger paths, and
a microcontroller configured to receive the sensor signals and, in response, generate aircraft control data.

Example 2. The handheld controller device of example 1,
wherein the housing comprises a wall that defines the side and has first and second openings therethrough;
wherein the pair of triggers comprises:
a first trigger having a first trigger arm extending from a first trigger pad into the first opening and terminating in a first trigger end, and
a second trigger having a second trigger arm extending from a second trigger pad into the second opening and terminating in a second trigger end; and
wherein the coupling assembly comprises:
a linkage disposed in the housing and extending between first and second linkage ends, the first and second linkage ends rotatably coupled to, respectively, the first and second trigger ends, and
a swivel joint coupling the linkage to the housing and connected to the linkage between the first and second linkage ends.

Example 3. The handheld controller device of example 2, wherein the one or more sensors comprises a sensor configured to generate the sensor signals based on one or both of a position or an orientation of the linkage.

Example 4. The handheld controller device of example 1 or any one of examples 2-3,
wherein the pair of triggers comprises:
a first trigger having a first travel path and a first default position thereon, and
a second trigger having a second travel path and a second default position thereon; and
wherein the trigger assembly comprises one or more biasing elements in the housing configured to bias the first and second triggers towards the first and second default positions, respectively.

Example 5. The handheld controller device of example 4, wherein the first and second default positions are midway along the first and second travel paths, respectively.

Example 6. The handheld controller device of example 4 or example 5, wherein the one or more biasing elements comprises one or more springs.

Example 7. The handheld controller device of example 4 or any one of examples 5-6, wherein the one or more biasing elements comprises one or more magnets.

Example 8. The handheld controller device of example 1 or any one of examples 2-7,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly; and
wherein the microcontroller is further configured to receive the second sensor signals and, in response, generate second aircraft control data.

Example 9. The handheld controller device of example 8, wherein the slider assembly comprises a knob connected to the shaft outside the housing.

Example 10. The handheld controller device of example 1 or any one of examples 2-9, wherein the one or more sensors comprises a rotary potentiometer.

Example 11. The handheld controller device of example 1 or any one of examples 2-10, wherein the one or more sensors comprises a Hall effect sensor.

Example 12. The handheld controller device of example 1 or any one of examples 2-11, wherein the circuitry comprises communication circuitry defining one or both of a wired communication interface and a wireless communication interface.

Example 13. The handheld controller device of example 1 or any one of examples 2-12,
wherein the microcontroller is configured to generate the aircraft control data for a flight simulator system;
wherein the circuitry comprises communication circuitry defining one or both of a wired communication interface and a wireless communication interface; and
wherein the communication circuitry is configured to communicate the aircraft control data from the handheld controller device to a component of the flight simulator system.

Example 14. The handheld controller device of example 1 or any one of examples 2-13,
wherein the microcontroller is configured to generate the aircraft control data for a remotely-controlled flyable aircraft;
wherein the circuitry comprises communication circuitry defining one or both of a wired communication interface and a wireless communication interface; and
wherein the communication circuitry is configured to communicate the aircraft control data from the handheld controller device to a component of the remotely-controlled flyable aircraft.

In some aspects of what is described, a flight simulation system may be described by the following examples:

Example 15. A flight simulator system, comprising:
a handheld controller device comprising:
a housing configured to be held in the hands of a user,
a trigger assembly comprising:
a pair of triggers extending outward from a side of the handheld controller device, the pair of triggers being configured to move along respective trigger paths, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path, and
circuitry disposed in the housing and comprising:
one or more sensors configured to generate sensor signals based on positions of the pair of triggers along their respective trigger paths, and
a microcontroller configured to receive the sensor signals and, in response, generate aircraft control data for a simulated aircraft; and
one or more computer processors configured to perform operations comprising:
receiving the aircraft control data from the handheld controller device, and
altering, in response to the aircraft control data, a position of one or more flight control surfaces of the simulated aircraft.

Example 16. The flight simulator system of example 15, wherein altering a position of the one or more flight control surfaces comprises controlling a yaw of the simulated aircraft.

Example 17. The flight simulator system of example 15 or example 16,
wherein the one or more flight control surfaces comprise surfaces defined by a rudder of the simulated aircraft; and
wherein altering a position of the one or more flight control surfaces comprises altering a position of the rudder.

Example 18. The flight simulator system of example 15 or example 16,
wherein the one or more flight control surfaces comprise surfaces defined by a tail rotor blade of the simulated aircraft; and
wherein altering a position of the one or more flight control surfaces comprises altering a blade pitch of the tail rotor blade.

Example 19. The flight simulator system of example 15, wherein altering a position of the one or more flight control surfaces comprises controlling a pitch of the simulated aircraft.

Example 20. The flight simulator system of example 15 or example 19,
wherein the one or more flight control surfaces comprise surfaces defined by an elevator of the simulated aircraft; and
wherein altering a position of the one or more flight control surfaces comprises altering a position of the elevator.

Example 21. The flight simulator system of example 15, wherein altering a position of the one or more flight control surfaces comprises controlling a roll of the simulated aircraft.

Example 22. The flight simulator system of example 15 or example 21,
wherein the one or more flight control surfaces comprise surfaces defined by an aileron of the simulated aircraft; and
wherein altering a position of the one or more flight control surfaces comprises altering a position of the aileron.

Example 23. The flight simulator system of example 15 or any one of examples 16-22,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second aircraft control data for the simulated aircraft; and
wherein the operations comprise:
receiving the second aircraft control data from the handheld controller device, and
altering, in response to the second aircraft control data, a flight control parameter of the simulated aircraft, the flight control parameter representing an operational characteristic of the simulated aircraft.

Example 24. The flight simulator system of example 23, wherein flight control parameter controls a throttle for an engine of the simulated aircraft.

Example 25. The flight simulator system of example 23, wherein flight control parameter controls an air-to-fuel mixture for an engine of the simulated aircraft.

Example 26. The flight simulator system of example 23, wherein flight control parameter controls an angle of attack for propeller blades of the simulated aircraft, the angle of attack influencing a rotational speed of the propeller blades.

Example 27. The flight simulator system of example 15 or any one of examples 16-26, comprising:
- a console comprising the one or more computer processors; and
- one or more communication channels between the handheld controller device and the console.

Example 28. The flight simulator system of example 27, wherein the one or more communication channels comprise a wired communication link between the handheld controller device and the console.

Example 29. The flight simulator system of example 27 or example 28, wherein the one or more communication channels comprise a wireless communication link between the handheld controller device and the console.

Example 30. The flight simulator system of example 15 or any one of examples 16-29, wherein the operations comprise:
- generating graphical data based on the position of the one or more flight control surfaces, the graphical data representing a position and an orientation of the simulated aircraft in a simulated environment.

Example 31. The flight simulator system of example 30, wherein generating graphical data comprises:
- generating graphical data in response to the altered position of the one or more flight control surfaces.

Example 32. The flight simulator system of example 30 or example 31, comprising:
- a presentation device in communication with a computing device comprising the one or more computer processors, the presentation device configured to display an image in response to receiving display signals from the computing device;
- wherein the operations comprise:
  - sending display signals to the presentation device based on the graphical data.

In some aspects of what is described, a remote control system may be described by the following examples:

Example 33. A remote control system, comprising:
- a handheld controller device comprising:
  - a housing configured to be held in the hands of a user,
  - a trigger assembly comprising:
    - a pair of triggers extending outward from a side of the handheld controller device, the pair of triggers being configured to move along respective trigger paths, and
    - a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path, and
  - circuitry disposed in the housing and comprising:
    - one or more sensors configured to generate sensor signals based on positions of the pair of triggers along their respective trigger paths, and
    - a microcontroller configured to receive the sensor signals and, in response, generate aircraft control data; and
- a control system of the remotely controlled flyable aircraft comprising one or more computer processors, the one or more computer processors configured to perform operations comprising:
  - receiving the aircraft control data from the handheld controller device, and
  - altering, in response to the aircraft control data, a position of one or more flight control surfaces of the remotely controlled flyable aircraft.

Example 34. The remote control system of example 33, wherein the one or more flight control surfaces comprises surfaces defined by a moveable body of remotely controlled flyable aircraft;
- wherein the control system comprises an actuator subsystem in communication with the one or more computer processors and configured to move the moveable body in response to motion signals received from the control system;
- wherein the operations comprise:
  - generating, by operation of the one or more computer processors, motion signals based on the aircraft control data from the handheld controller device; and
- wherein altering the position of the one or more flight control surfaces comprises:
  - sending the motion signals to the actuator subsystem to alter a position of the moveable body.

Example 35. The remote control system of example 34, wherein the moveable body is a rudder of the remotely controlled flyable aircraft.

Example 36. The remote control system of example 34, wherein the moveable body is a tail rotor blade of the remotely controlled flyable aircraft and the position is a blade pitch.

Example 37. The remote control system of example 34, wherein the moveable body is an elevator of the remotely controlled flyable aircraft.

Example 38. The remote control system of example 34, wherein the moveable body is an aileron of the remotely controlled flyable aircraft.

Example 39. The remote control system of example 33 or any one of examples 34-36, wherein altering a position of the one or more flight control surfaces comprises controlling a yaw of the remotely controlled flyable aircraft.

Example 40. The remote control system of example 33 or any one of examples 34 or 37, wherein altering a position of the one or more flight control surfaces comprises controlling a pitch of the remotely controlled flyable aircraft.

Example 41. The remote control system of example 33 or any one of examples 34 or 38, wherein altering a position of the one or more flight control surfaces comprises controlling a roll of the remotely controlled flyable aircraft.

Example 42. The remote control system of example 33 or any one of examples 34-41,
- wherein the housing comprises a wall having a hole therethrough;
- wherein the handheld controller device comprises a slider assembly having a shaft disposed through the hole and configured to move along a slider path;
- wherein the circuitry comprises a second sensor configured to generate second sensor signals based on a position of the slider assembly;
- wherein the microcontroller is further configured to receive the second sensor signals and, in response, generate second aircraft control data for the remotely controlled flyable aircraft; and wherein the operations comprise:
receiving the second aircraft control data from the handheld controller device, and
altering, in response to the second aircraft control data, a flight control parameter of the remotely controlled flyable aircraft, the flight control parameter representing an operational characteristic of the remotely controlled flyable aircraft.

Example 43. The remote control system of example 42, wherein flight control parameter controls a throttle for an engine of the remotely controlled flyable aircraft.

Example 44. The remote control system of example 42, wherein flight control parameter controls an air-to-fuel mixture for an engine of the remotely controlled flyable aircraft.

Example 45. The remote control system of example 42, wherein flight control parameter controls an angle of attack for propeller blades of the remotely controlled flyable aircraft, the angle of attack influencing a rotational speed of the aircraft propeller blades.

Example 46. The remote control system of example 33 or any one of examples 34-35, comprising one or more communication channels between the handheld controller device and the control system of the remotely controlled flyable aircraft.

Example 47. The remote control system of example 46, wherein the one or more communication channels comprise a wired communication link between the handheld controller device and the control system.

Example 48. The remote control system of example 46 or example 47, wherein the one or more communication channels comprise a wireless communication link between the handheld controller device and the control system.

Example 49. The remote control system of example 33 or any one of examples 34-48, wherein the remotely controlled flyable aircraft is an unmanned aerial vehicle (UAV) or a drone.

In some aspects of what is described, a flight control method may be described by the following examples:

Example 47. A flight control method, comprising:
generating sensor signals based on positions of a pair of triggers on a handheld controller device, the handheld controller device comprising:
a housing configured to be held in the hands of a user, and
a trigger assembly comprising:
the pair of triggers, extending outward from a side of the handheld controller device and configured to move along respective trigger paths, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path; generating aircraft control data in response to the sensor signals; and communicating the aircraft control data from the handheld controller device.

Example 48. The flight control method of example 47, wherein communicating the aircraft control data comprises communicating the aircraft control data to a component of a flight simulator system; and
wherein the method comprises:
by operation of one or more computer processors of the flight simulator system, controlling a direction of a simulated aircraft in a flight simulation in response to the aircraft control data.

Example 49. The flight control method of example 48, wherein controlling a direction comprises controlling a yaw of the simulated aircraft.

Example 50. The flight control method of example 48, wherein controlling a direction comprises controlling a pitch of the simulated aircraft.

Example 51. The flight control method of example 48, wherein controlling a direction comprises controlling a roll of the simulated aircraft.

Example 52. The flight control method of example 47,
wherein communicating the aircraft control data comprises communicating the aircraft control data to a remotely controlled flyable aircraft; and
wherein the method comprises:
by operation of one or more computer processors in a control system of the remotely controlled flyable aircraft, controlling a direction of the remotely controlled flyable aircraft in response to the aircraft control data.

Example 53. The flight control method of example 48, wherein controlling a direction comprises controlling a yaw of the remotely controlled flyable aircraft.

Example 54. The flight control method of example 48, wherein controlling a direction comprises controlling a pitch of the remotely controlled flyable aircraft.

Example 55. The flight control method of example 48, wherein controlling a direction comprises controlling a roll of the remotely controlled flyable aircraft.

Example 56. The flight control method of example 47 or any one of examples 48-55,
wherein the coupling assembly comprises a linkage disposed in the housing and coupled to the pair of triggers, and
wherein generating sensor signals comprises sensing one or both of a position and an orientation of the linkage.

While this specification contains many details, these should not be understood as limitations on the scope of what may be claimed, but rather as descriptions of features specific to particular examples. Certain features that are described in this specification and shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A handheld controller device comprising:
a housing configured to be held in the hands of a user;
a trigger assembly comprising:
  a pair of triggers extending outward from a side of the handheld controller device, the pair of triggers being configured to move along respective trigger paths, and
  a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path; and
circuitry disposed in the housing and comprising:
  one or more sensors configured to generate sensor signals based on positions of the pair of triggers along their respective trigger paths, and
  a microcontroller configured to receive the sensor signals and, in response, generate aircraft control data.

2. The handheld controller device of claim 1,
wherein the housing comprises a wall that defines the side and has first and second openings therethrough;
wherein the pair of triggers comprises:
  a first trigger having a first trigger arm extending from a first trigger pad into the first opening and terminating in a first trigger end, and
  a second trigger having a second trigger arm extending from a second trigger pad into the second opening and terminating in a second trigger end; and
wherein the coupling assembly comprises:
  a linkage disposed in the housing and extending between first and second linkage ends, the first and second linkage ends rotatably coupled to, respectively, the first and second trigger ends, and
  a swivel joint coupling the linkage to the housing and connected to the linkage between the first and second linkage ends.

3. The handheld controller device of claim 1,
wherein the pair of triggers comprises:
  a first trigger having a first trigger path and a first default position thereon, and
  a second trigger having a second trigger path and a second default position thereon; and
wherein the trigger assembly comprises one or more biasing elements in the housing configured to bias the first and second triggers towards the first and second default positions, respectively.

4. The handheld controller device of claim 3, wherein the first and second default positions are midway along the first and second trigger paths, respectively.

5. The handheld controller device of claim 3, wherein the one or more biasing elements comprises one or more springs.

6. The handheld controller device of claim 3, wherein the one or more biasing elements comprises one or more magnets.

7. The handheld controller device of claim 1,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly; and
wherein the microcontroller is further configured to receive the second sensor signals and, in response, generate second aircraft control data.

8. The handheld controller device of claim 7, wherein the slider assembly comprises a knob connected to the shaft outside the housing.

9. The handheld controller device of claim 1, wherein the one or more sensors comprises a rotary potentiometer.

10. The handheld controller device of claim 1, wherein the one or more sensors comprises a Hall effect sensor.

11. A flight simulator system, comprising:
a handheld controller device comprising:
  a housing configured to be held in the hands of a user,
  a trigger assembly comprising:
    a pair of triggers extending outward from a side of the handheld controller device, the pair of triggers being configured to move along respective trigger paths, and
    a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path, and
  circuitry disposed in the housing and comprising:
    one or more sensors configured to generate sensor signals based on positions of the pair of triggers along their respective trigger paths, and
    a microcontroller configured to receive the sensor signals and, in response, generate aircraft control data for a simulated aircraft; and
one or more computer processors configured to perform operations comprising:
  receiving the aircraft control data from the handheld controller device, and
  altering, in response to the aircraft control data, a position of one or more flight control surfaces of the simulated aircraft.

12. The flight simulator system of claim 11, wherein altering a position of the one or more flight control surfaces comprises controlling a yaw of the simulated aircraft.

13. The flight simulator system of claim 11, wherein altering a position of the one or more flight control surfaces comprises controlling a pitch of the simulated aircraft.

14. The flight simulator system of claim 11, wherein altering a position the one or more flight control surfaces comprises controlling a roll of the simulated aircraft.

15. The flight simulator system of claim 11,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second aircraft control data for the simulated aircraft; and wherein the operations comprise:
   receiving the second aircraft control data from the handheld controller device, and
   altering, in response to the second aircraft control data, a flight control parameter of the simulated aircraft, the flight control parameter representing an operational characteristic of the simulated aircraft.

16. The flight simulator system of claim 15, wherein flight control parameter controls:
   a throttle for an engine of the simulated aircraft;
   an air-to-fuel mixture for an engine of the simulated aircraft; or
   an angle of attack for propeller blades of the simulated aircraft, the angle of attack influencing a rotational speed of the propeller blades.

17. The flight simulator system of claim 11, comprising:
   a console comprising the one or more computer processors; and
   one or more communication channels between the handheld controller device and the console.

18. The flight simulator system of claim 17, wherein the one or more communication channels comprise a wired communication link between the handheld controller device and the console.

19. The flight simulator system of claim 17, wherein the one or more communication channels comprise a wireless communication link between the handheld controller device and the console.

20. A flight control method, comprising:
   generating sensor signals based on positions of a pair of triggers on a handheld controller device, the handheld controller device comprising:
      a housing configured to be held in the hands of a user, and
      a trigger assembly comprising:
         the pair of triggers, extending outward from a side of the handheld controller device and configured to move along respective trigger paths, and
         a coupling assembly disposed inside the housing and connected to the pair of triggers, the coupling assembly configured to transfer motion between the pair of triggers such that, when either of the triggers moves towards the housing along its trigger path, the coupling assembly moves the other trigger an equal distance away from the housing along its respective trigger path;
   generating aircraft control data in response to the sensor signals; and
   communicating the aircraft control data from the handheld controller device.

21. The flight control method of claim 20,
   wherein communicating the aircraft control data comprises communicating the aircraft control data to a component of a flight simulator system; and
   wherein the method comprises:
      by operation of one or more computer processors of the flight simulator system, controlling a yaw in a flight simulation in response to the aircraft control data.

22. The flight control method of claim 20,
   wherein communicating the aircraft control data comprises communicating the aircraft control data to a remotely controlled flyable aircraft; and
   wherein the method comprises:
      by operation of one or more computer processors in a control system of the remotely controlled flyable aircraft, controlling a yaw of the remotely controlled flyable aircraft in response to the aircraft control data.

23. The flight control method of claim 20,
   wherein the coupling assembly comprises a linkage disposed in the housing and coupled to the pair of triggers, and
   wherein generating sensor signals comprises sensing one or both of a position and an orientation of the linkage.

* * * * *